(12) United States Patent
Tomura et al.

(10) Patent No.: US 6,859,532 B2
(45) Date of Patent: Feb. 22, 2005

(54) ADAPTER FOR PORTABLE TELEPHONE USABLE AS MOBILE TELEPHONE IN VEHICLE

(75) Inventors: Masashi Tomura, Sapporo (JP); Hiroaki Sakashita, Sapporo (JP); Hiroshi Kubo, Sapporo (JP); Daizo Funaya, Sapporo (JP); Hidekatsu Kobayashi, Sapporo (JP); Yoshifumi Tsukamoto, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/799,934

(22) Filed: Mar. 6, 2001

(65) Prior Publication Data

US 2001/0010719 A1 Aug. 2, 2001

Related U.S. Application Data

(62) Division of application No. 09/176,164, filed on Oct. 21, 1998, now Pat. No. 6,266,544, which is a division of application No. 08/974,143, filed on Nov. 19, 1997, now abandoned, which is a continuation of application No. 08/594,501, filed on Jan. 31, 1996, now abandoned.

(30) Foreign Application Priority Data

Aug. 11, 1995 (JP) ............................................. 7-206259

(51) Int. Cl.$^7$ ................................................. H04M 1/00
(52) U.S. Cl. ....................................... 379/446; 379/455
(58) Field of Search ........................ 379/433.01, 433.1, 379/433.12, 433.13, 446, 455; 455/90, 575

(56) References Cited

U.S. PATENT DOCUMENTS

| | | | |
|---|---|---|---|
| 4,299,344 A | 11/1981 | Yamashita | |
| 5,189,358 A | 2/1993 | Tomura | |
| 5,261,121 A | 11/1993 | Hashimoto | |
| 5,303,291 A | * 4/1994 | Takagi et al. | 379/433.13 |
| 5,463,688 A | * 10/1995 | Wijas | 379/446 |
| 5,519,777 A | 5/1996 | Kurgan | |
| 5,703,932 A | 12/1997 | Oda | |
| 5,748,727 A | 5/1998 | Lundell | |
| 5,845,217 A | 12/1998 | Lindell | |
| 6,266,544 B1 | * 7/2001 | Tomura et al. | 455/90 |

FOREIGN PATENT DOCUMENTS

| | | |
|---|---|---|
| JP | 03-027158 | 2/1991 |
| JP | 3-85949 | 4/1991 |
| JP | 03-085949 | 4/1991 |
| JP | 3-160852 | 7/1991 |
| JP | 3-101056 | 10/1991 |
| JP | 4-6936 | 1/1992 |
| JP | 4-14349 | 1/1992 |
| JP | 5-122315 | 5/1993 |
| JP | 6-132869 | 5/1994 |
| JP | 6-252821 | 9/1994 |
| JP | 7-164448 | 3/1995 |

\* cited by examiner

Primary Examiner—Jack Chiang
(74) Attorney, Agent, or Firm—Katten Muchin Zavis Rosenman

(57) ABSTRACT

An adapter in which a portable telephone having a socket including terminals connected to electric terminals therein is receivable includes an adapter body having a concave portion in which the portable telephone is receivable, a connector provided in the adapter body so as to be exposed to the concave portion, the connector having terminals connected to predetermined electric units including at least an antenna, the connector being connectable the socket of the portable telephone, and a clamping mechanism for clamping the portable telephone received in the concave portion of the adapter body in a state where the connector is connected to the socket of the portable telephone so that the terminals of the connector are in contact with the terminals of the socket of the portable telephone.

2 Claims, 30 Drawing Sheets

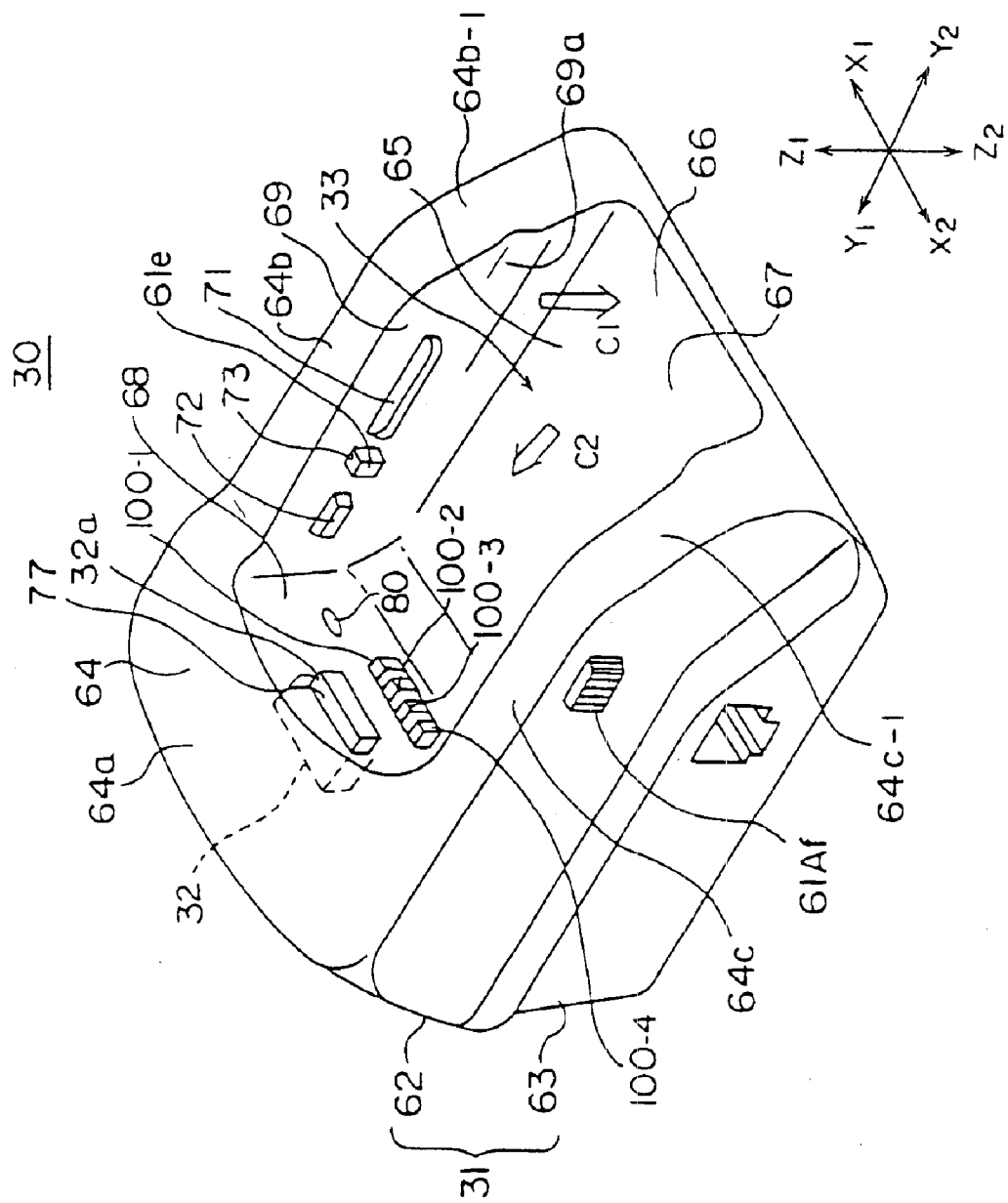

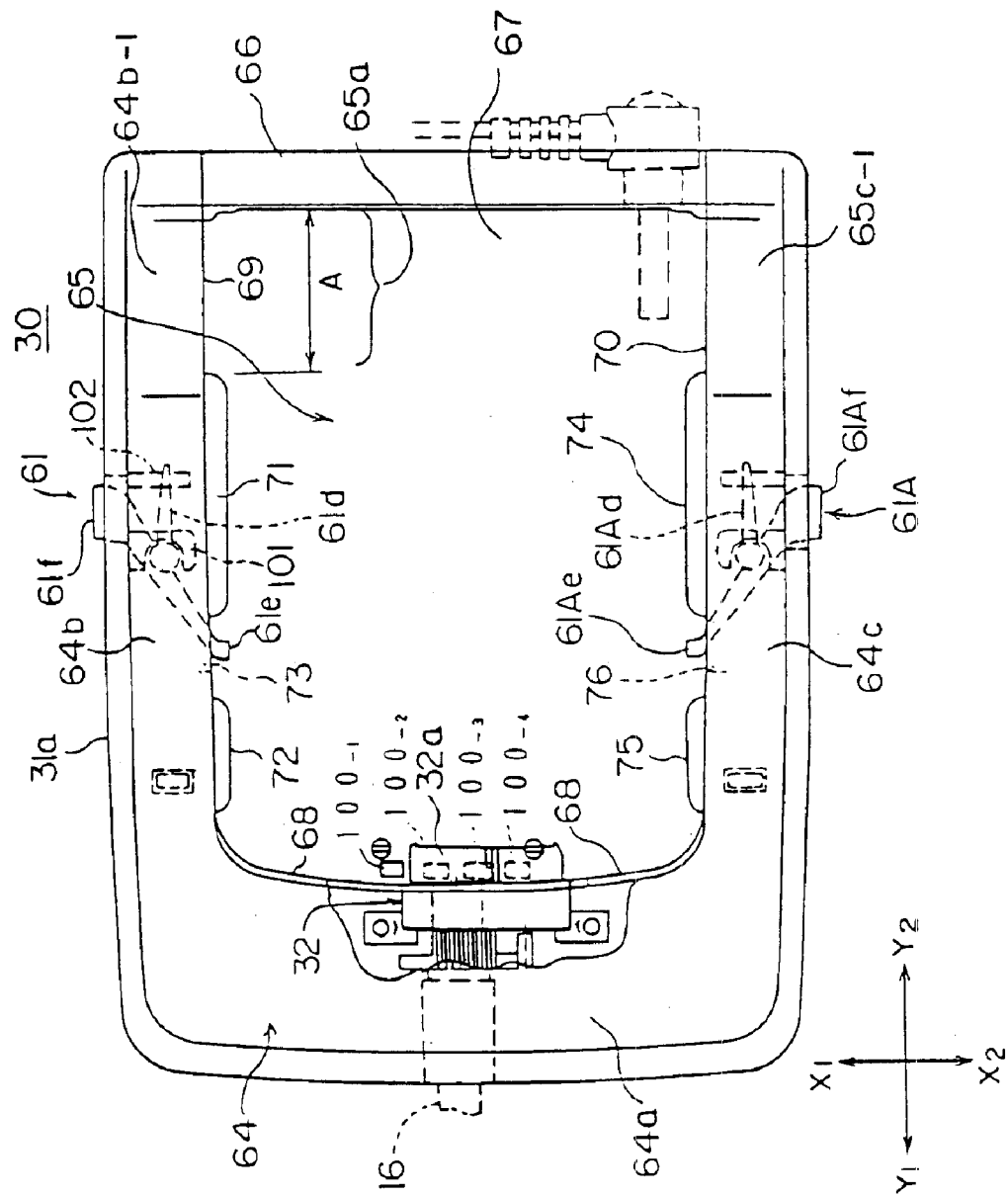

$a = W_2$
$b = \ell_1$ $a = W_2$
$b = l_1$

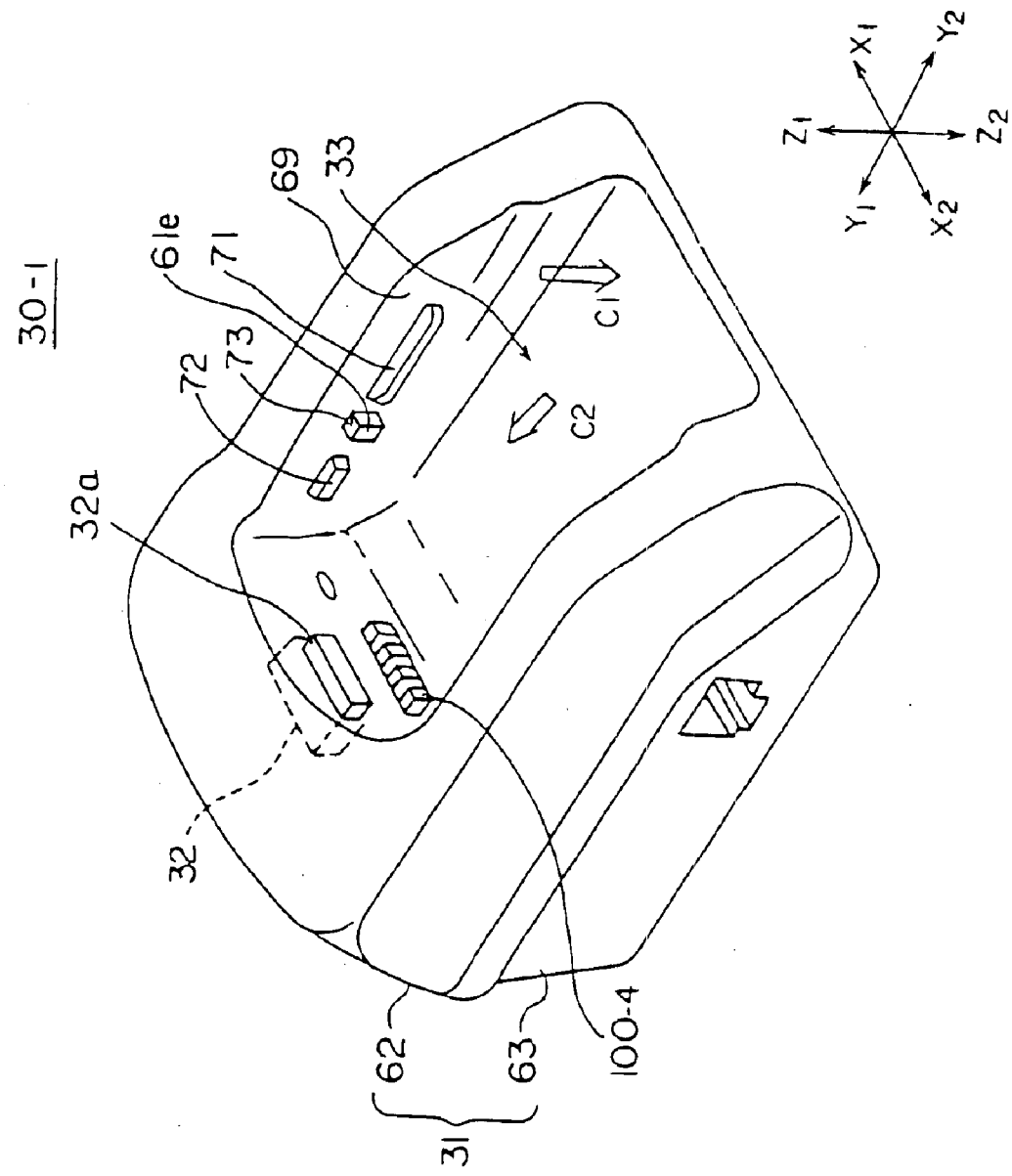

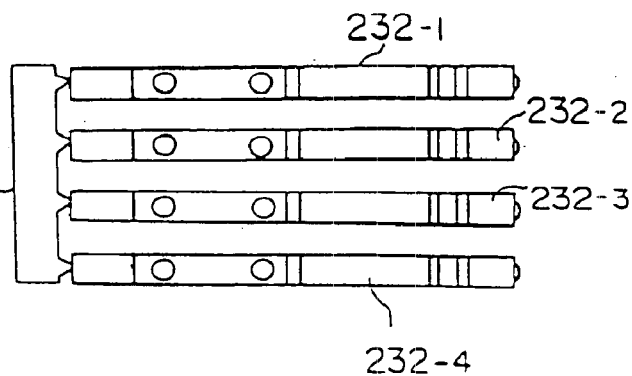
FIG. 32A
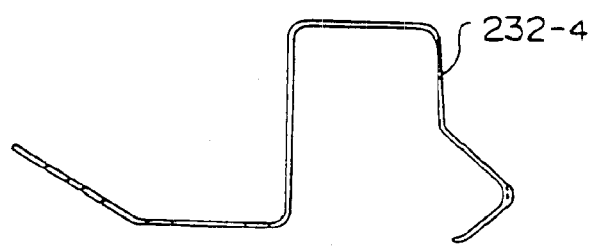
FIG. 32B
FIG. 33
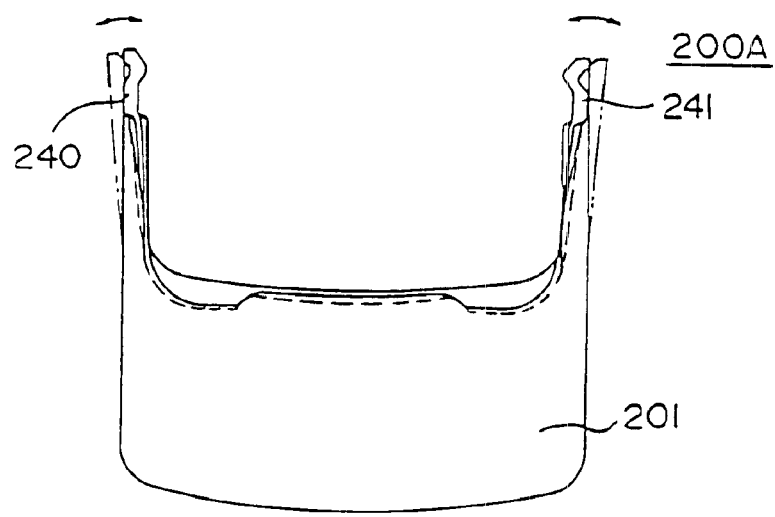

ADAPTER FOR PORTABLE TELEPHONE USABLE AS MOBILE TELEPHONE IN VEHICLE

This application is a DIV of Ser. No. 09/176,164 Oct. 21, 1998 U.S. Pat. No. 6,266,544 which is a DIV of Ser. No. 08/974,143 Nov. 19, 1997 ABN which is a CON of Ser. No. 08/594,501 Jan. 31, 1996 ABN

BACK GROUND OF THE INVENTION (1) Field of the Invention

The present invention generally relates to an adapter for a portable telephone, and more particularly to an adapter for a portable telephone which can be used as a mobile telephone in a vehicle.

(2) Description of the Related Art

In a case where a portable telephone is used as a mobile telephone in a vehicle, it is important to be capable of simply operating the portable telephone.

A conventional adapter for a portable telephone is shown in FIG. 1. Referring to FIG. 1, an adapter 10 has an adapter body 11 and a connector 13. The connector is mounted at an end of a curl cord 12 extending from the adapter body 11. The adapter body 11 is installed in the vehicle 14. The adapter body 11 is connected with a cord 16 extending from an antenna 15 provided on the vehicle 14 and wires 18 extending from a battery 17 provided in the vehicle 14.

A user of the portable telephone 20 gets into the vehicle 14 and connects the connector 13 at the end of the curl cord 12 to a socket 21 formed at an end surface of the portable telephone 20 as shown by an arrow A in FIG. 1. The user then sets the portable telephone 20 on a telephone setting portion 19 of the adapter body 11 as shown by an arrow B in FIG. 1.

In a state where the portable telephone 20 is connected to the adapter 10 as described above, the portable telephone 20 can be used as a mobile telephone in the vehicle 14. In this state, a battery 22 of the portable telephone 20 is charged by the battery 17 in the vehicle 17.

To make the portable telephone 20 capable of use as the mobile telephone in the vehicle 14, it is necessary for the user to carry out at least two operations: a connecting operation for connecting the connector 13 to the socket 21 of the portable telephone 20 (see the arrow A) and a setting operation for setting the portable telephone 20 on the adapter body 11 (see the arrow B). Specifically, since the connector 13 is small, the connecting operation is awkward.

In addition, the curl cord 12 is formed of a coaxial cable 23 which is expensive. Thus, the production costs of the adapter 10 for the portable telephone 20 is increased.

SUMMARY OF THE INVENTION

Accordingly, a general object of the present invention is to provide a novel and useful adapter for a portable telephone in which the disadvantages of the aforementioned prior art are eliminated.

A more specific object of the present invention is to provide an adapter to which a portable telephone can be connected by simple operations.

Another object of the present invention is to provide an adapter in which the production costs can be decreased.

The above objects of the present invention are achieved by an adapter in which a portable telephone having a first connecting unit including terminals connected to electric terminals therein is receivable, the adapter comprising: an adapter body having a concave portion in which the portable telephone is receivable; a second connecting unit provided in the adapter body so as to be exposed to the concave portion, the second connecting unit having terminals connected to predetermined electric units including at least an antenna, the second connecting unit being connectable to the first connecting unit of the portable telephone; and a clamping mechanism for clamping the portable telephone received in the concave portion of the adapter body in a state where the second connecting unit is connected to the first connecting unit of the portable telephone so that the terminals of the second connecting unit are in contact with the terminals of the first connecting unit of the portable telephone.

According to the present invention, when the portable telephone is set in the adapter body and clamped by the clamping mechanism, the portable telephone and adapter are electrically connected with each other via the first and second connecting units. Thus, due to simple operations, the portable telephone and the adapter can be electrically connected with each other.

In addition, to electrically connect the adapter and the portable telephone, the curl cord is not needed. Thus, the production cost of the adapter can be decreased.

BRIEF DESCRIPTION OF THE DRAWINGS

Other objects, features and advantages of the present invention will be apparent from the following detailed description when read in conjunction with the accompanying drawings, in which:

FIG. 5 is a perspective view illustrating the adapter for the portable telephone;

FIG. 6 is a plan view illustrating the adapter for the portable telephone;

FIG. 24 is a perspective view illustrating the adapter having the clamping unit shown in FIGS. 23A, 23B, 23C, 23D and 23E;

FIGS. 32A and 32B are diagrams illustrating terminals provided in the charging module shown in FIG. 31;

FIG. 33 is a diagram illustrating a first variation of the vibrator module;

DESCRIPTION OF PREFERRED EMBODIMENTS

Figure 1:
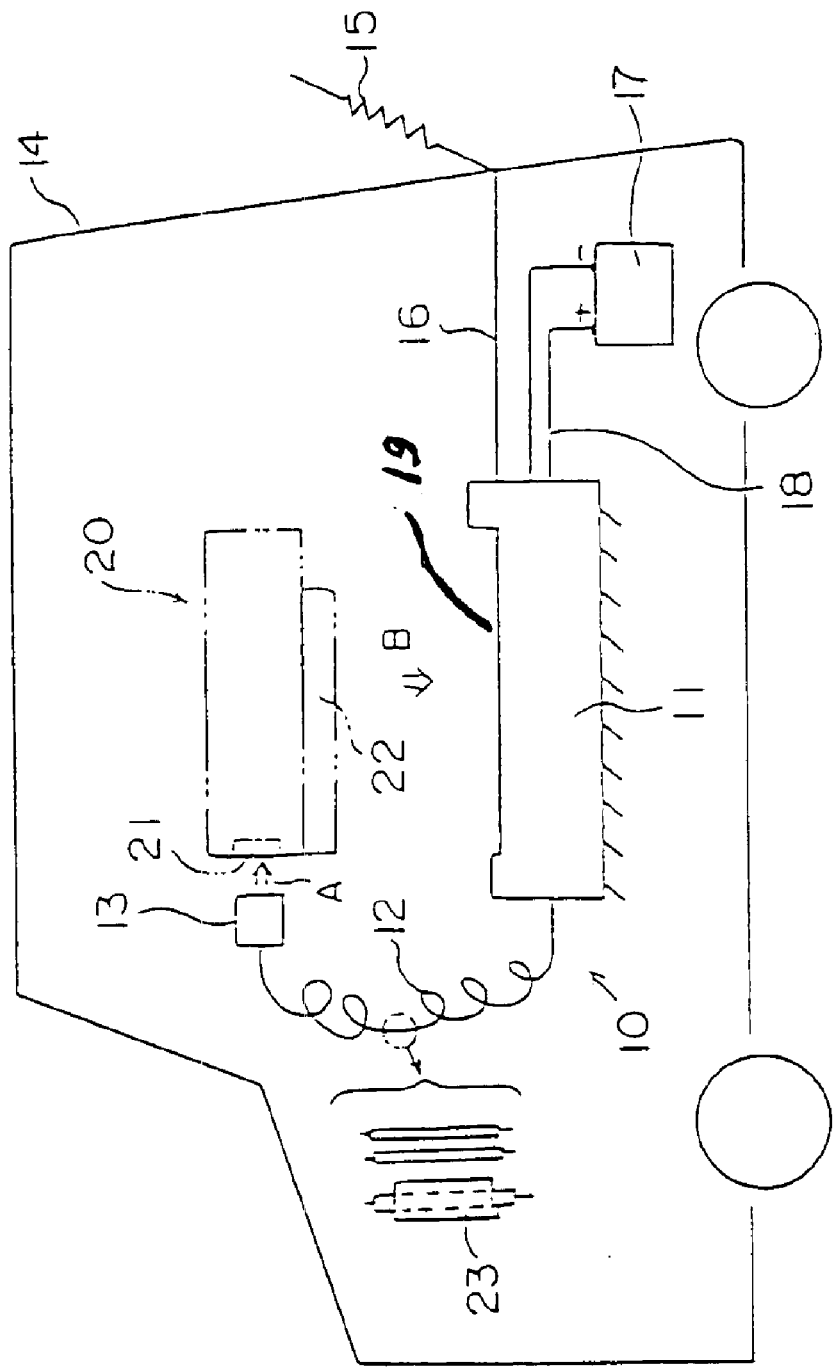
FIG. 1 is a diagram illustrating a conventional adapter for a portable telephone usable as a mobile telephone in a vehicle.
Figure 2:
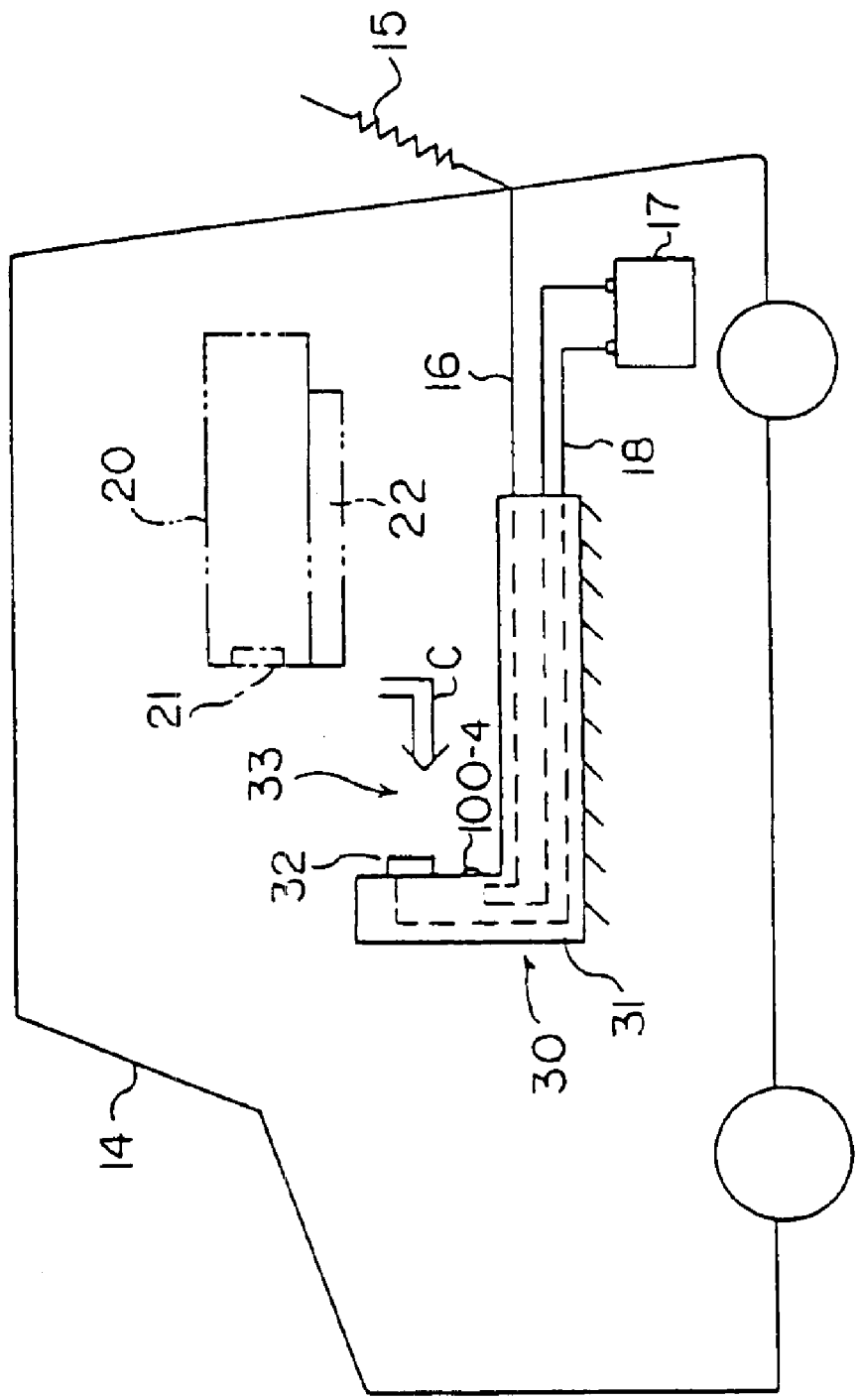
FIG. 2 is a diagram illustrating the principle of an adapter for a portable telephone usable as a mobile telephone in a vehicle according to an embodiment of the present invention.
Figure 3:
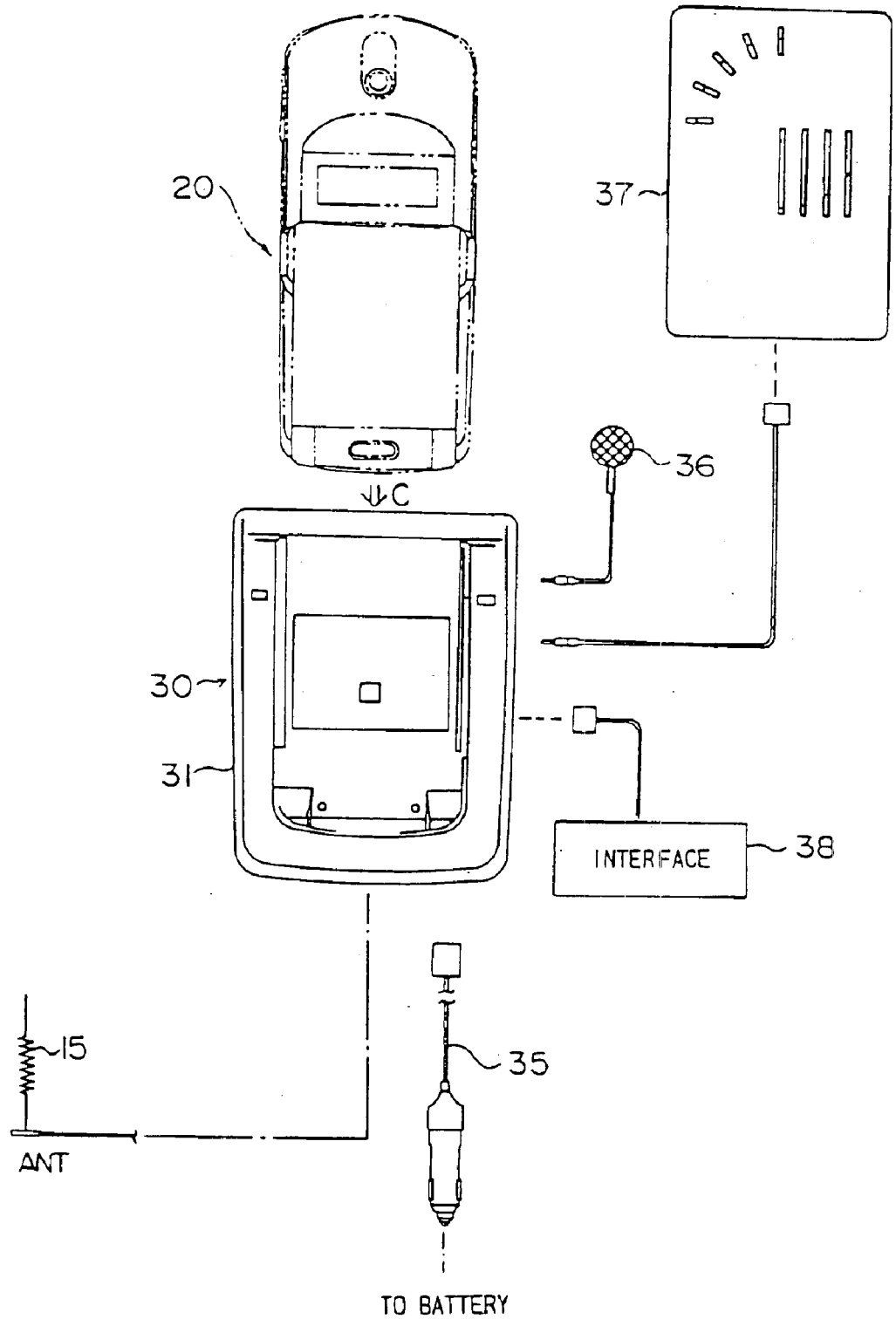
FIG. 3 is a diagram illustrating an adapter and a portable telephone according to the embodiment of the present invention.

A description will now be given, with reference to FIGS. 2 and 3, a system in which a portable telephone is capable of being set in an adapter according to an embodiment of the present invention. In FIGS. 2 and 3, those parts which are the same as those shown in FIG. 1 are given the same reference numbers.

Referring to FIG. 3, an adapter 30 which is installed in the vehicle has an adapter body 31, an antenna connector 32 and charging terminals 100-4. A cradle 33 is formed in the adapter body 31. The portable telephone 20 is set in the cradle 33 of the adapter body 31. The connector 32 is provided on the adapter body so as to be exposed to the cradle 33. The connector 32 is connected with an end of the cord 16, and the charging terminals 100-4 are connected with ends of the wires 18 extending from the battery 17.

A user of the portable telephone 20 gets into the vehicle 14. The user brings the portable telephone 20 to the adapter 30, as show by an arrow C, so that the socket 21 of the portable telephone 20 faces the antenna connector 32 and sets it on the cradle 33 of the adapter body 31.

When the portable telephone 20 is set at a regular position in the adapter 30, the connector 32 is connected with the socket 21 of the portable telephone 20. As a result, the portable telephone 20 is usable as a mobile telephone in the vehicle 14. The battery 22 of the portable telephone is charged by the battery 17 in the vehicle 14.

As has been described above, the portable telephone 20 can be set in the adapter 30 by a simple action (see the arrow C in FIG. 2) so that the connector 32 is connected with the socket 21 of the portable telephone 20.

As shown in FIG. 3, actually, the adapter 30 is coupled to the battery 17 in the vehicle 14 via a cigarette-lighter cord 35. In addition, the adapter 30 is connected with a hand-free microphone 36, a loud speaker 37 and an interface circuit 38.

The portable telephone 20 is formed as shown in FIGS. 4A, 4B, 4C and 4D.

Referring to FIGS. 4A through 4D, the back of the portable telephone 20 is mounted with an S-type battery pack 22. An L-type battery pack and an M-type battery pack can be substituted for the S-type battery pack 22 as shown by chain double-dashed lines.

Figure 4C:
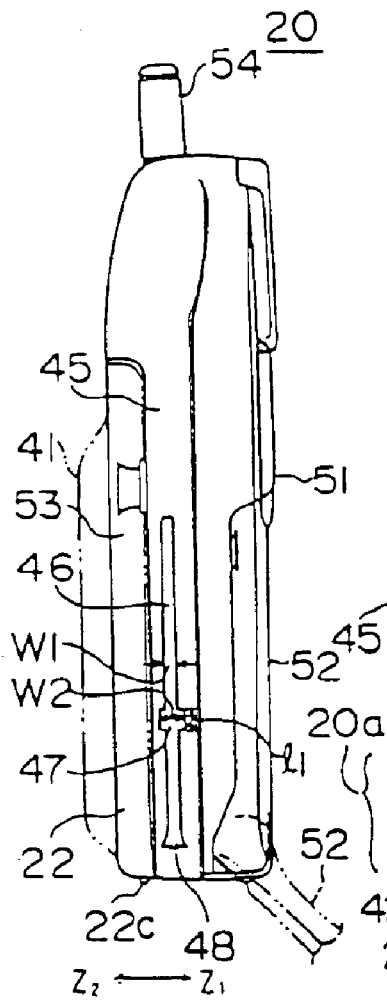
FIGS. 4A, 4B, 4C and 4D are diagrams illustrating a portable telephone.
Figure 4A:
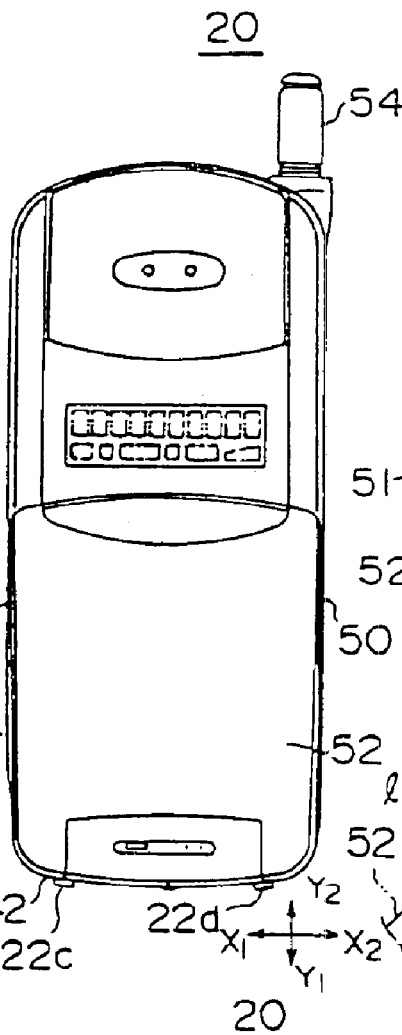
Figure 4D:
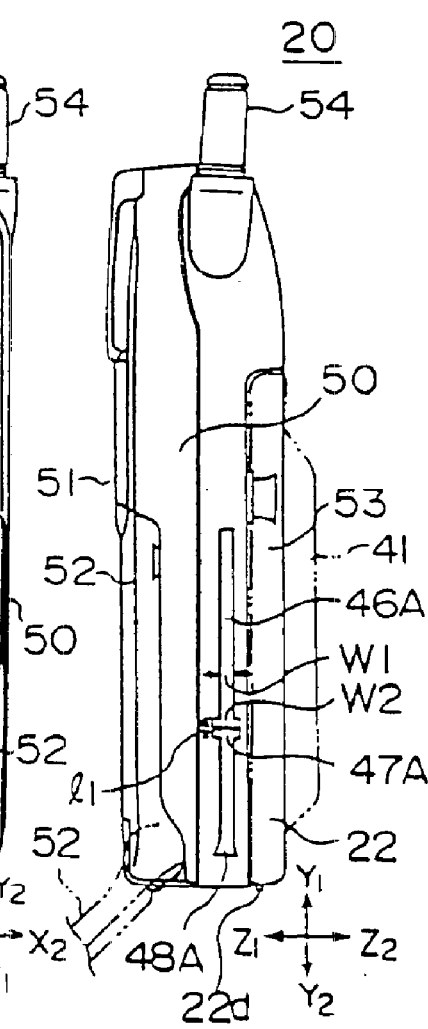
Figure 4B:
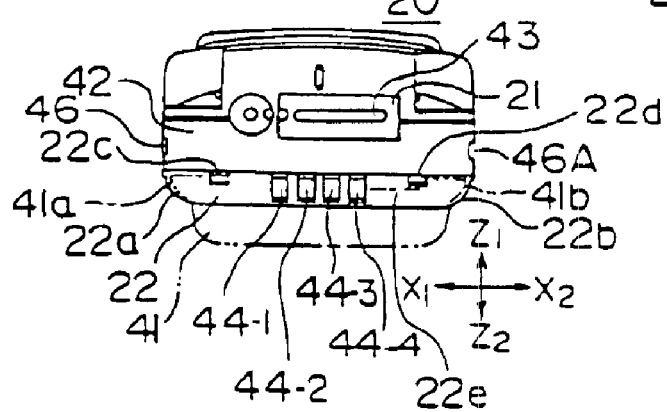

As shown in FIG. 4B, the socket 21 is formed on a surface 42 (referred to as a socket side surface 42) of the portable telephone 20. The socket side surface 42 is an end surface of the portable telephone 20 in a direction Y1 shown in FIG. 4A. A plurality of terminals 43 are arranged in the socket 21. Four terminals 44-1 through 44-4 of the S-type battery pack 22 are arranged on the socket side surface 42. The terminal 44-1 is used for charging, the terminal 44-2 is used for detecting a temperature, the terminal 44-3 is used for identifying the battery and the terminal 44-4 is used for the ground. The socket side surface 42 is opposite to a surface from which an antenna 54 projects. The portable telephone 20 is brought to the adapter 30 so that the socket side surface 42 faces the connector 32 of the adapter 30.

Figure 13A:
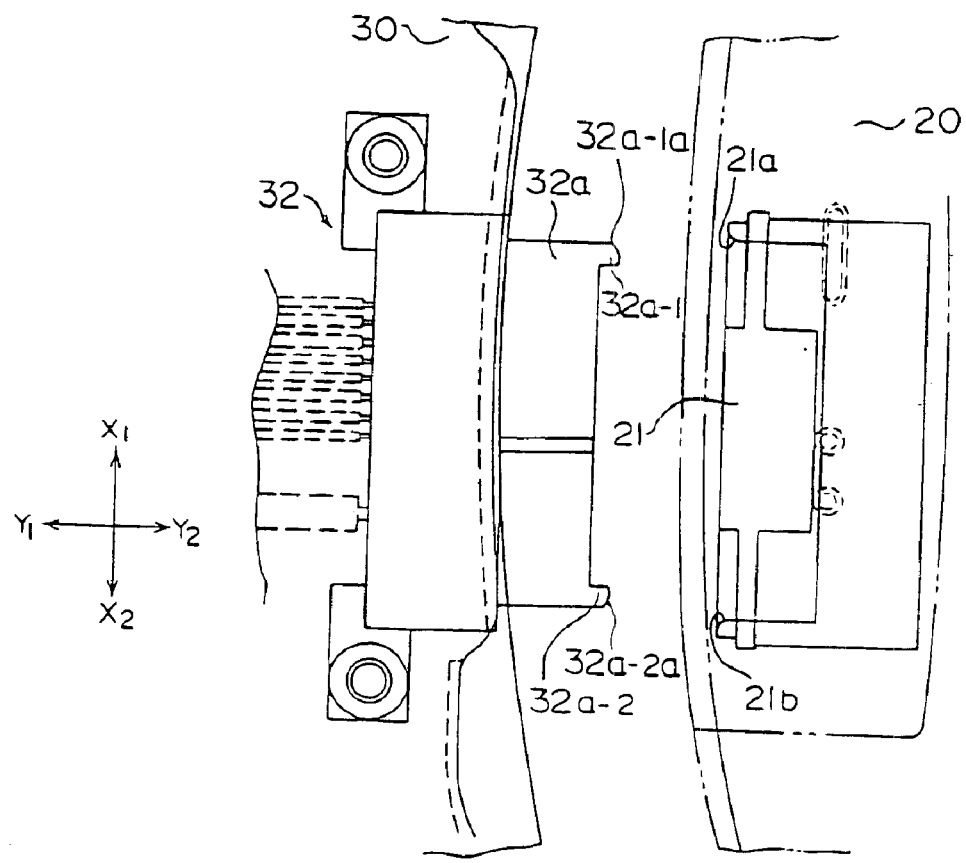
FIGS. 13A and 13B are diagrams illustrating an antenna connector of the adapter and a socket of the portable telephone both of which face each other.
Figure 13B:
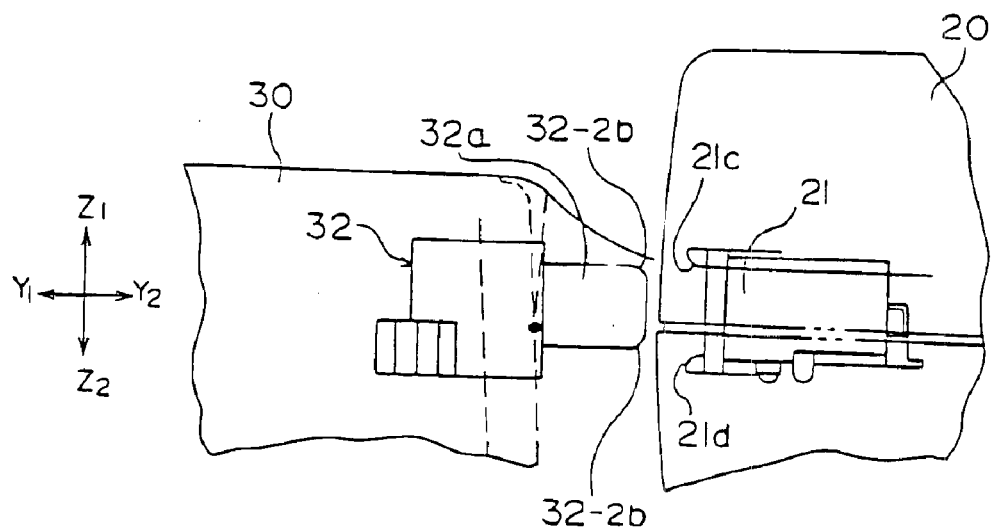

Four edges 21a, 21b, 21c and 21c of a square opening of the socket 21 are rounded inside, as shown in FIGS. 13A and 13B.

A side surface 45 of the portable telephone 20 which faces in a direction X1 is provided with a guide groove 46. The guide groove 46 extends in directions Y1 and Y2. The guide groove 46 has a clamping concave portion 47 formed at approximately the center thereof. The clamping concave portion 47 has a width W2 greater than a width W1 of the guide groove 46 and a length 11. An end 48 of the guide groove 46 in the direction Y1 is spread. A side surface 50 of the portable telephone 20 which faces in a direction X2 is provided with a guide groove 46A. The guide groove 46A has the same shape as the guide groove 46 formed on the side surface 45 opposite to the side surface 50. The guide groove 46A thus has a clamping concave portion 47A in the same manner as the guide groove 46 described above. A flipper 52 which can be opened and closed is provided on a surface 51 of the portable telephone 20.

A description will now be given, with reference to FIGS. 5 through 14E, of an adapter 30 for the portable telephone 20 described above.

Figure 7:
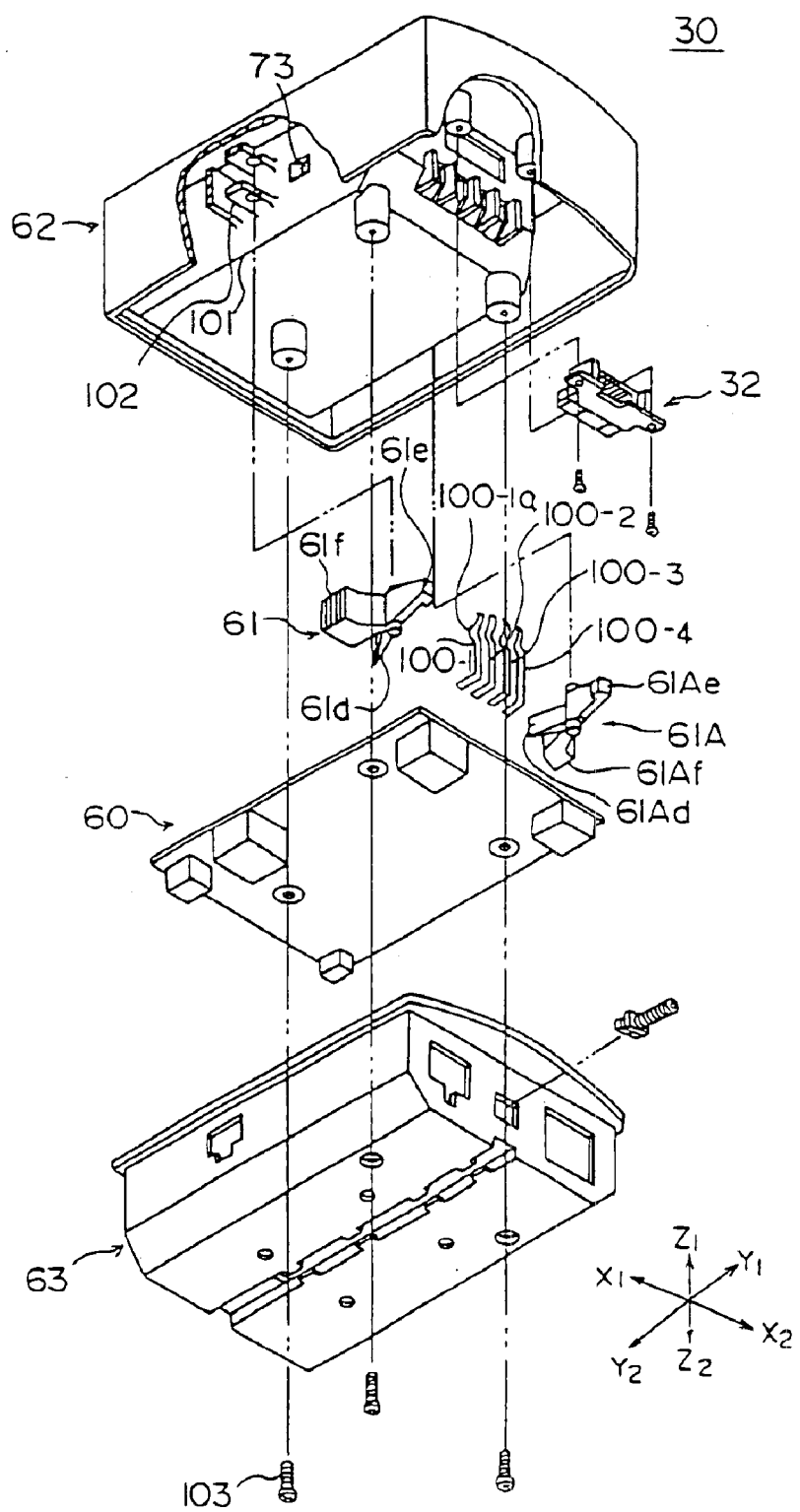
FIG. 7 is an exploded perspective bottom view illustrating the adapter for the portable telephone.

As shown in FIGS. 5 and 7, the adapter 30 has an adapter body 31 which is formed of an upper case 62 and a lower case 63. The adapter body 31 is provided with a circuit board assembly 60, the antenna connector 32, terminals 100-1 through 100-4 and clamping units 61 and 61A. The cradle 33 is formed on a top surface of the upper case 62.

The cradle 33, as shown in FIG. 5, is a concave portion 65 in a U-shaped surrounding 64. The concave portion 65 is engaged with a setting part 53 of the portable telephone 20 shown in FIG. 4D. The U-shaped surrounding 64 has a base 64a located in an end of the adapter body 31 and arm portions 64b and 64c which extend from the ends of the base 64 in the direction Y2 in parallel. An opening 66 between ends of the arm portions 64b and 64c is formed so that the base 64a faces the opening 66. Inclined surfaces 64b-1 and 64c-1 are respectively formed at the ends of the arm portions 64b and 64c. The concave portion 65 has a space sufficient to be engaged with the setting part 53 of the portable telephone 20 having the L-type battery pack 41.

Referring to FIGS. 5 and 6, an inner surface 69 of the arm portion 64b is provided with guide ribs 71 and 72 which are arranged in the directions Y1 and Y2. An opening 73 is formed between the guide ribs 71 and 72 on the inner surface 69 of the arm portion 64b. Also, an inner surface 70 of the arm portion 64b is provided with guide ribs 74 and 75, and an opening 76 is formed between the guide ribs 74 and 75 on the inner surface 70.

There is a distance A between the guide rib 71 and the end of the arm portion 64b. Thus, in a space 65a having a width A from the opening 66, there is no guide rib. The space 65a in the concave portion 65 is used to temporarily put the portable telephone 20 therein. The inclined surfaces 64b-1 and 64c-1 of the arm portions 64b and 64c correspond to the space 65a, so that it is easy to put the portable telephone 20 in the space 65a.

Figure 11:
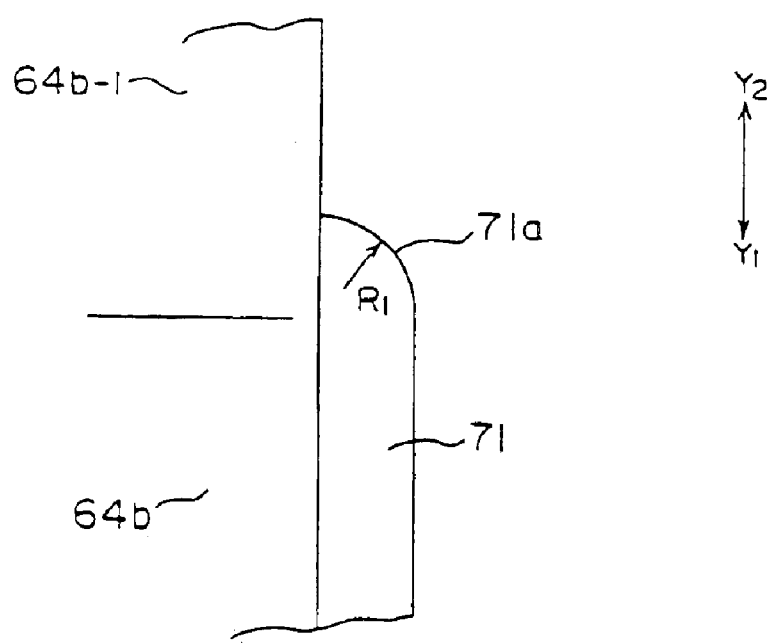
FIG. 11 is a diagram illustrating a detailed shape of a guide rib.
Figure 12:
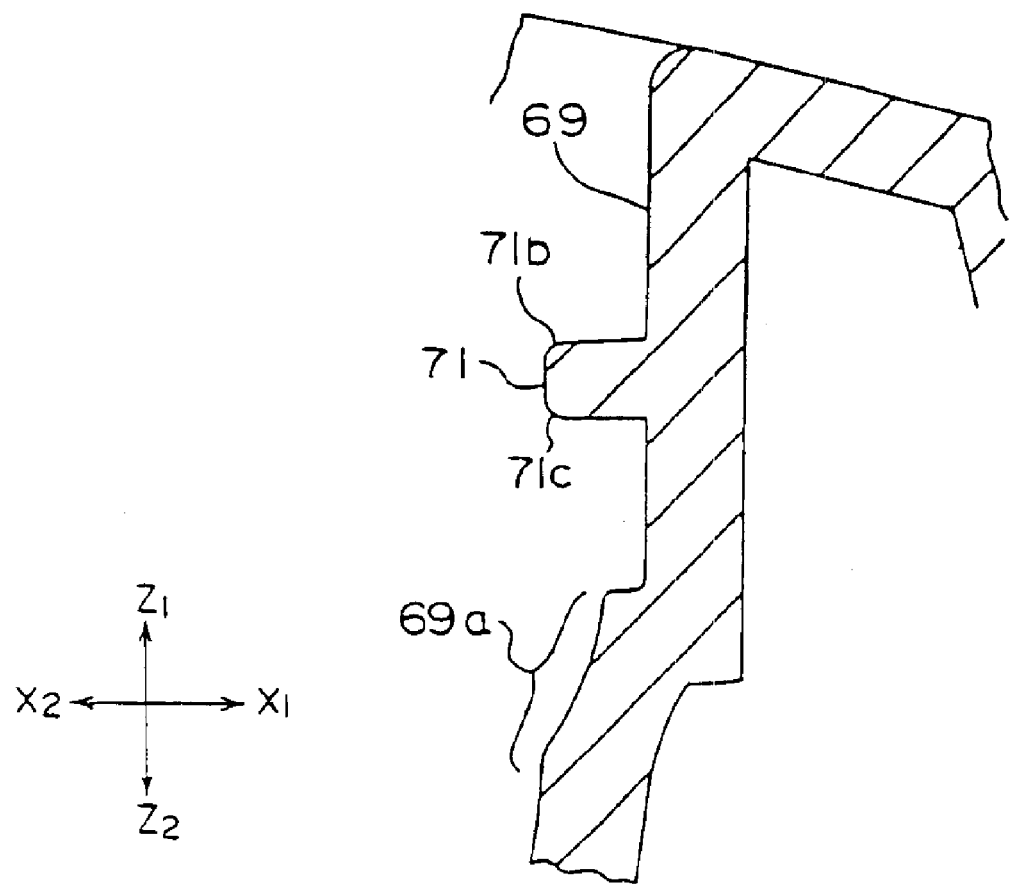
FIG. 12 is a cross sectional view illustrating the guide rib.

As shown in FIG. 11, the end of the guide rib 71, which end faces the opening 66, is rounded so that a curved surface with a radius R1 is formed at the end of the guide rib 71. As a result, when the portable telephone 20 is set in the cradle 33, the guide groove 46 of the portable telephone 20 can be smoothly engaged with the guide rib 71 of the adapter 30. In addition, as shown in FIG. 12, the guide rib 71 has a square shaped cross section, and an upper edge 71b and a lower edge 71c of the guide rib 71 are rounded. As a result, the guide groove 46 of the portable telephone 20 is not harmed by the guide rib 71.

Figure 9:
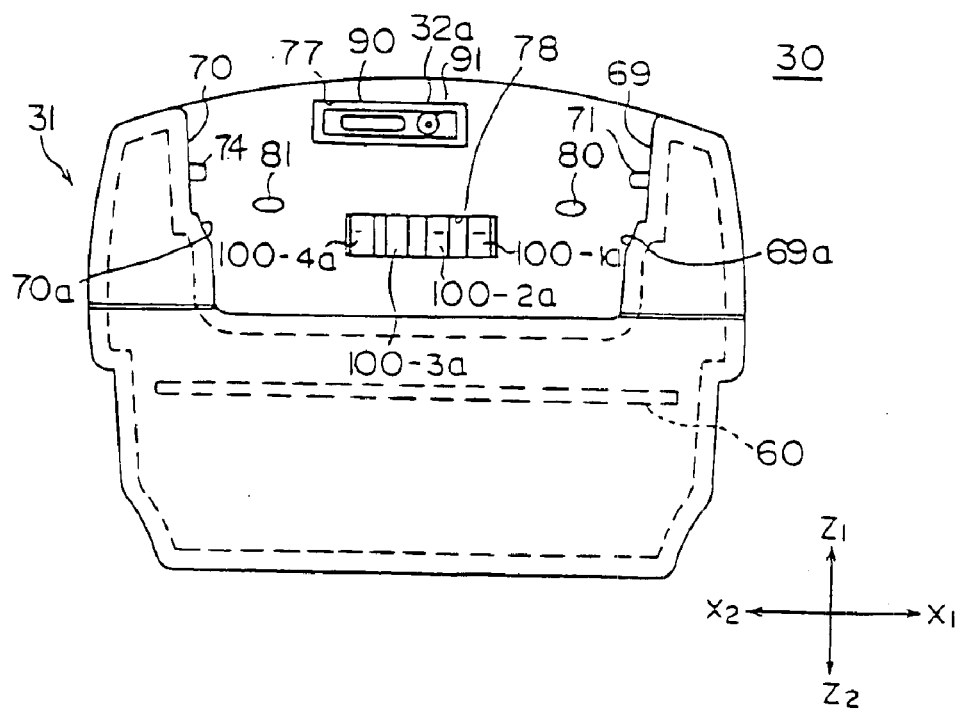
FIG. 9 is a view in a Y1 direction (a front view) illustrating the adapter for the portable telephone.
Figure 10:
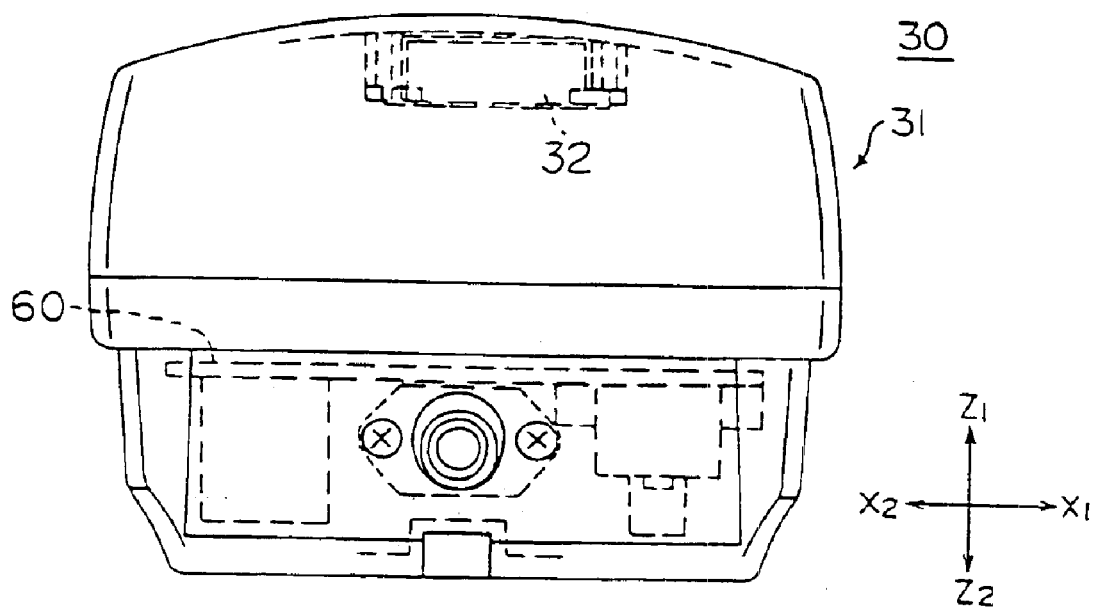
FIG. 10 is a view in a Y2 direction (a rear view) illustrating the adapter for the portable telephone.

As shown in FIG. 4D, the S-type battery pack 22 and the L-type battery pack 21 respectively have surfaces 22a and 22b and 41a and 41b. The surfaces 22a and 22b have the same shape as the surfaces 41a and 41b. The surfaces 22 and 22b of the S-type battery pock 22 loaded on the portable telephone 20 are respectively located at the same positions as the surfaces 41a and 41b of the L-type battery pack 41 loaded on the portable telephone 20. As shown in FIG. 9, a supporting surface 69a which can support the surface 22a of the S-type battery pack 22 and the surface 41a of the L-type battery pack 41 is formed on the inner surface 69 of the arm portion 64b. A supporting surface 70a which can support the surface 22b of the S-type battery pack 22 and the surface 41b of the L-type battery pack 41 is formed on the inner surface 70 of the arm portion 64c.

The connector 32 is fixed on the upper case 62 by screws so as to be exposed to the cradle 33. As shown in FIGS. 5 and 6, a plug 32a of the connector 32 projects from an opening 77 formed on an inner surface 68 of the base 64. The plug 32 is formed rectangularly. A plurality of metal terminals 90 and a coaxial terminal 91 are arranged in the plug 32a. The relative position of the plug 32a of the connector 32 to the guide ribs 71, 72, 74 and 75 corresponds to the relative position of the socket 21 of the portable telephone 20 to the guide grooves 46 and 46A.

The connector 32 is connected with the cord 16.

As shown in FIGS. 13A and 13B, the plug 32a has projections 32a-1 and 32a-2 formed on the ends thereof in the directions X1 and X2. The tips of the projections 32a-1 and 32a-2 are rounded outside so that rounded portions 32a-1a and 32a-2a are formed. The upper and lower ends of the projections 32a-1 and 32a-2 are rounded so that rounded portions 32a-1b and 32a-2b. According to this structure of the plug 32a, when the portable telephone 20 is set in the cradle 33, the socket 21 of the portable telephone 33 can be smoothly engaged with the plug 32a.

Figure 8:
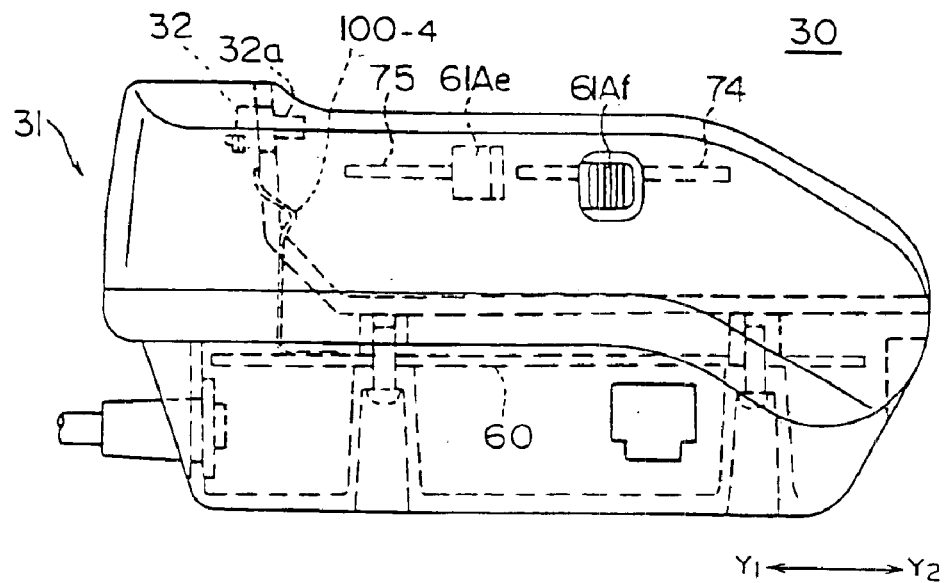
FIG. 8 is a view in an X1 direction (a side view) illustrating the adapter for the portable telephone.

As shown in FIGS. 6, 7 and 9, contacts 100-1a through 100-4a of the terminals 100-1 through 100-4 fixed on the circuit board assembly 60 are arranged in the opening 78 formed on the inner surface 68 and project therefrom. The terminal 100-4 is used for the charging power supply. The terminal 100-3 is used to identify the type of battery. The terminal 100-2 is used for temperature detection. The terminal 100-1 is used as a ground terminal. The terminal 100-4 is exposed to the cradle 33 as shown in FIG. 8. The relative positions of the contacts 100-1a through 100-4a to the guide ribs 71, 72, 74 and 75 correspond to the relative positions of the terminals 44-1 through 44-4 of the S-type battery pack 22 set in the portable telephone 20 to the guide grooves 46 and 46A.

The clamping unit 61 is formed as shown in FIGS. 14A, 14B, 14C, 14D and 14E. The clamping unit 61 has a shaft 61a, a first arm 61b, a second arm 61c, a third arm 61d, a clamping claw 61e and a pushing portion 61f. The first arm 61b and the second arm 61c project from the shaft 61a in opposite directions. The clamping unit 61 is made of polycarbonate which is one of the plastic materials having a large elastic coefficient (a high bendability). The third arm 61d functions as a leaf spring. The clamping claw 61e has a size corresponding to the size of the clamping concave portion 47 of the guide groove 46 formed on the portable telephone 20 as shown in FIG. 4C. That is, the clamping claw 61e has a height corresponding to the width W1 of the clamping concave portion 47 and a width corresponding to the length 11 of the clamping concave portion 47.

Figure 14A:
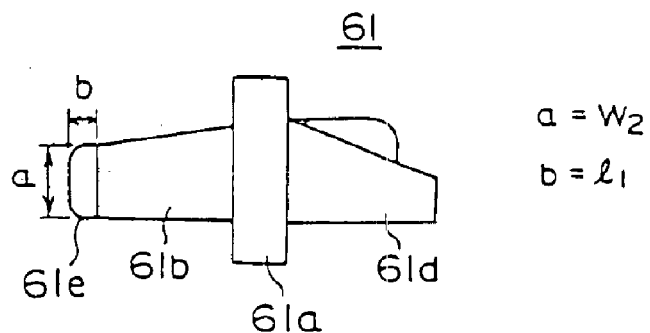
FIGS. 14A, 14B, 14C, 14D and 14E are diagrams illustrating a clamping unit.
Figure 14E:
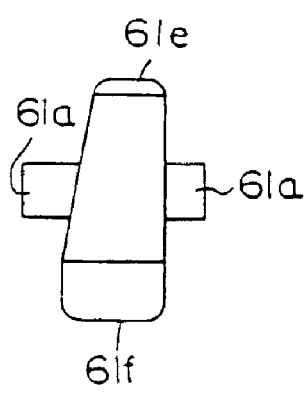
Figure 14B:
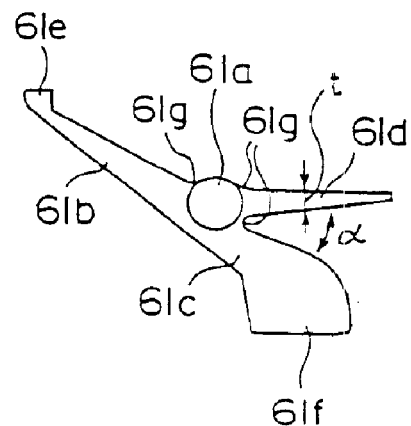
Figure 14D:
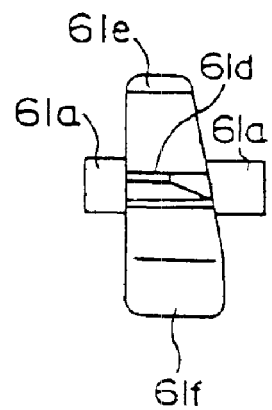
Figure 14C:
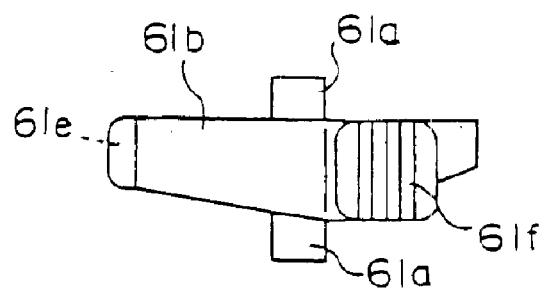

As shown in FIG. 14B, a joint portion between the shaft 61a and each of the first arm 61b, the second arm 61c and third arm 61d is rounded, so that the strength of the first through third arms 61b, 61c and 61d is improved.

The clamping unit 61A is made of the same material as the clamping unit 61 described above. The structure of the clamping unit 61A is the mirror image of that of the clamping unit 61 as shown in FIG. 7.

As shown in FIGS. 6 and 7, The clamping unit 61 is mounted in the arm portion 64b. The shaft 61a of the clamping unit 61 is rotatably engaged with bearings 101 formed on the upper case 62. Third arm 61d of the clamping unit 61 is engaged with a stopper slot 102. The clamping claw 61e projects from the opening 73 to the concave portion 65. The pushing portion 61f projects from a side surface 31 of the adapter body 31. The clamping unit 61A is mounted in the arm portion 64c in the same manner as the clamping unit 61.

When an operator seizes the adapter body 31 so that fingers of the operator push the pushing portions 61f and 61Af, the third arms 61d and 61Ad are bent and the clamping units 61 and 61A are slightly rotated. As a result, the clamping claws 61e and 61Ae are respectively drawn back into the insides of the arm portions 64b and 64c. When the fingers of the operator are released from the pushing portions 61f and 61Af, the clamping units 61 and 61A return to the original state due to spring forces of the third arms 61d and 61Ad. As a result, the clamping claws 61e and 61Ae project from the opening 73 to the concave portion 65.

As shown in FIG. 7, all parts (the connector 32, the clamping units 61 and 61A, the circuit board assembly 60 and the like) of the adapter 30 are mounted in the upper case 62. After all the parts of the adapter 30 are mounted in the upper case 62, the upper case 62 is integrated with the lower case 63, and the upper case 62 and the lower case 63 are fixed by screws 103 with the circuit board assembly 60.

A description will now be given of operations for setting the portable telephone 20 on the adapter 30. In this case, the S-type battery pack 22 is loaded in the portable telephone 20.

The portable telephone 20 is set on the adapter 30 by two operations. In the first operation, the socket side portion 20a of the portable telephone 20 shown in FIG. 4C is moved in a direction C1 shown in FIG. 5 and put in the space 65a (see FIG. 6) of the cradle 33. In the second operation, the portable telephone is pressed in a direction C2 shown in FIG. 5 until the socket 21 reaches the connector 32.

A detailed description of the first and second operations follows.

Figure 15:
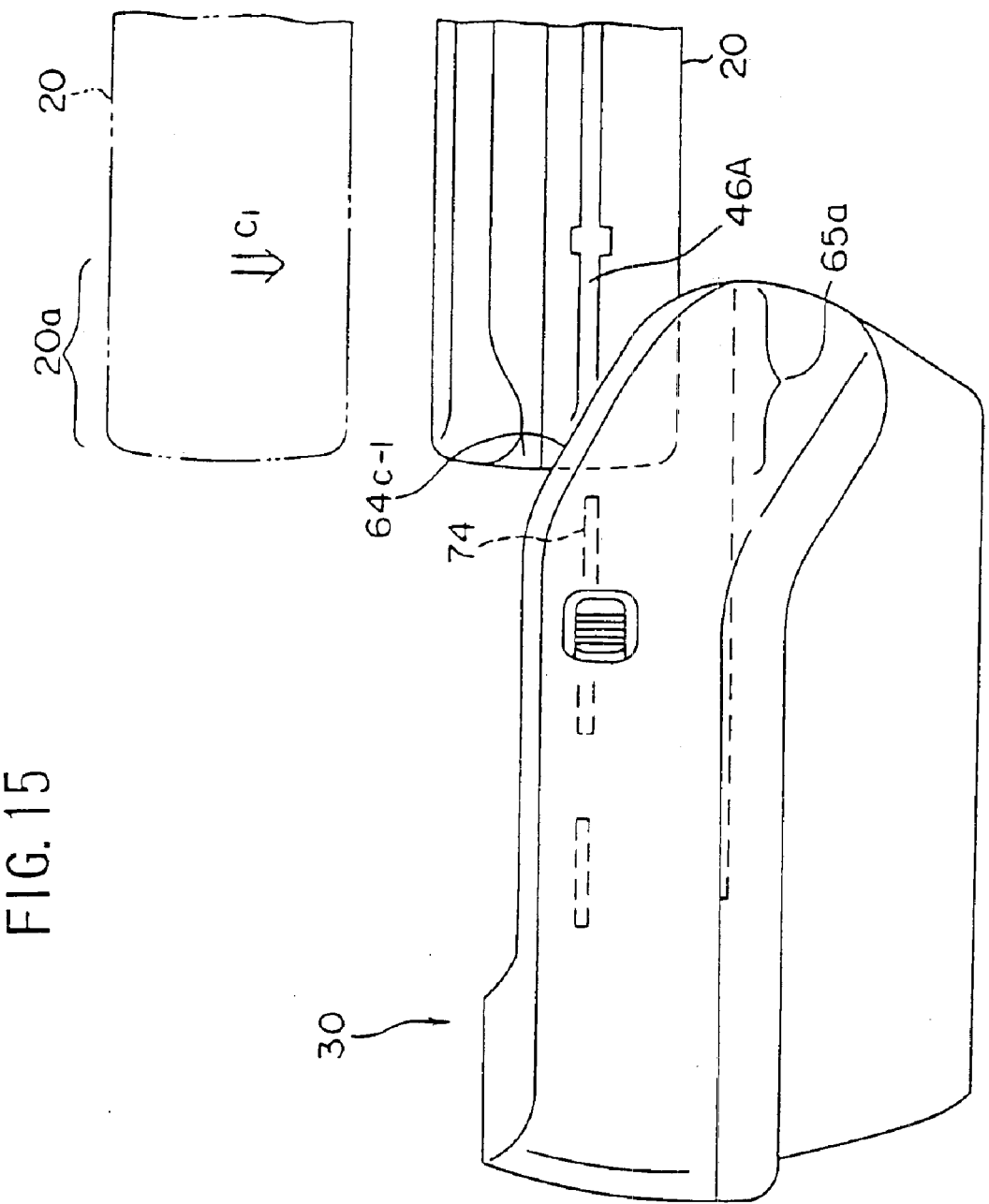
FIGS. 15 and 16 are diagrams illustrating an operation for putting the portable telephone on the adapter.
Figure 16:
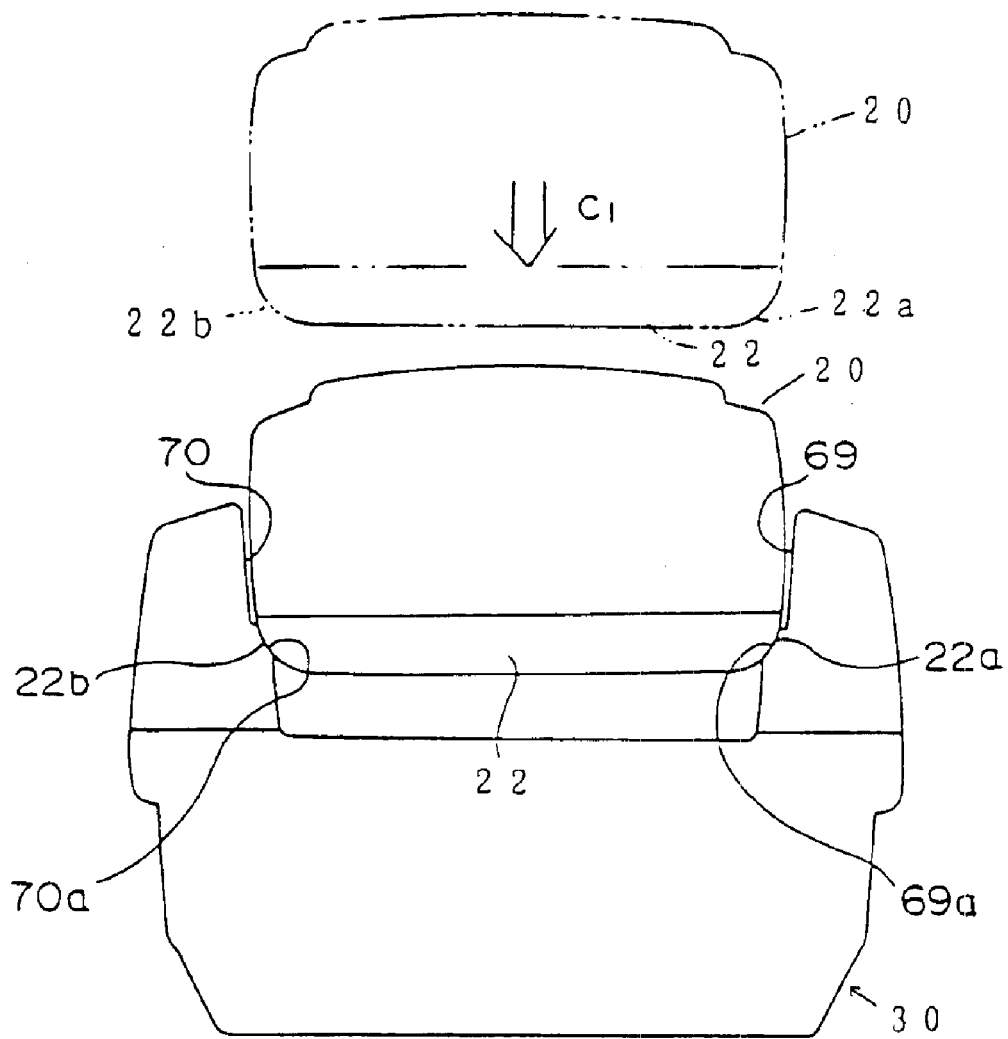

The first operation is illustrated in FIGS. 15 and 16. The inclined surfaces 64b-1 and 64c-1 are formed on the arm portions 64b and 64c so as to correspond to the space 65a on which the socket side portion 20a of the portable telephone 20 should be put. Thus, the socket side portion 20a of the portable telephone 20 is smoothly moved between the arm portions 64b and 64c and put in the space 65a. In a state where the socket side portion 20a of the portable telephone 20 is put in the space 65a, the surfaces 22a and 22b of the S-type battery pack 22 are supported by the supporting surfaces 69a and 70a of the inner surfaces 69 and 70 of the arm portions 64b and 64c, as shown in FIG. 16. In this state, the distance between the bottom surface of the cradle 33 and the guide grooves 46 and 46A of the portable telephone 20 is equal to the distance between the bottom surface of the cradle 22 and the guide ribs 71 and 74.

After the first operation is completed, the second operation follows.

Immediately after the portable telephone 20 is pressed in the direction Y1 so as to slide on the supporting surfaces 69a and 70a of the arm portions 64b and 64c, the leading ends of the guide grooves 46 and 46A of the portable telephone 20 are engaged with the guide ribs 71 and 74 of the adapter 30. Since the ends 48 and 48A of the guide grooves 46 and 46A are spread, the guide grooves 46 and 46A are smoothly engaged with the guide ribs 71 and 74.

While the guide grooves 46 and 46A are being guided by the guide ribs 71 and 74, the portable telephone 20 is moved. Then, the socket side surface 42 of the portable telephone 20 pushes the clamping claws 61e and 61Ae out. When the clamping claws 61e and 61Ae are pushed out, the clamping unit 61 and 61A are in a state where the clamping claws 61e and 61Ae are stressed by the spring forces of the third arms 61d and 61Ad in directions in which the clamping claws 61e and 61Ae should project from the openings 72 and 76 to the concave portion 65.

The portable telephone 20 is further moved, and the leading ends of the guide grooves 46 and 46A are then engaged with the guide ribs 72 and 75.

Finally, the following operations are performed.

Figure 19A:
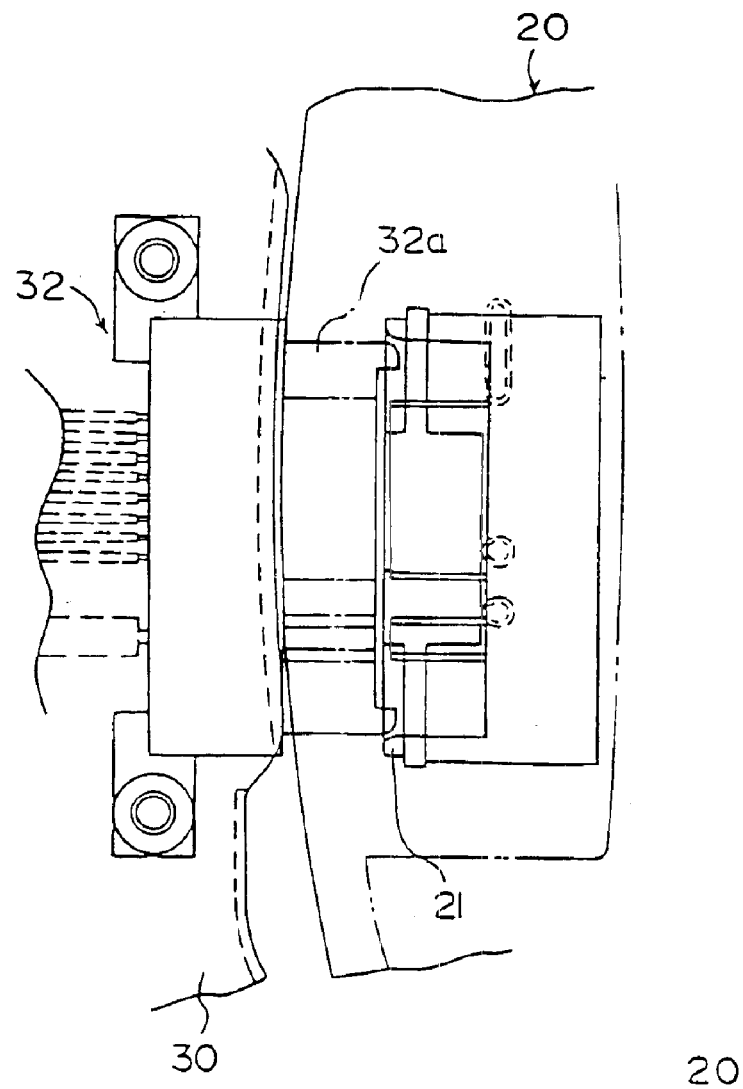
FIGS. 19A and 19B are diagrams illustrating a state where the socket and the antenna connector are connected with each other.
Figure 19B:
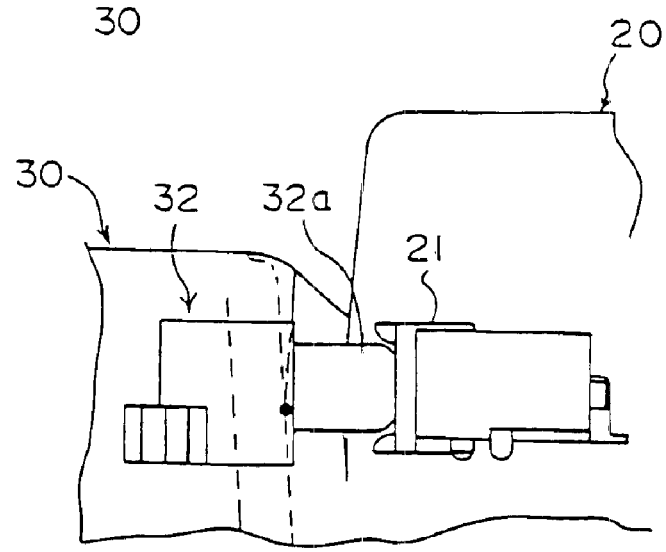

First, the portable telephone 20 is connected to the connector 32. That is, as shown in FIGS. 19A and 19B, the socket 21 of the portable telephone 20 is engaged with the plug 32a of the connector 32 so that the terminals 43 in the socket 21 are electrically connected to the metal terminals 90 and the coaxial terminal 91 in the plug 32a. The portable telephone 20 is guided by the guide ribs 71, 72, 74 and 75 so that the height of the portable telephone 20 is limited and the socket 21 of the portable telephone 20 and the plug 32a of the adapter 30 face each other. Further, as shown in FIGS. 13A and 13B, the plug 32 has the projection portions 32a-1 and 32a-2 of the plug 32 and the edges 21a, 21b, 21c and 21c of a square opening of the socket 21 are rounded inside. Thus, the socket 21 of the portable telephone 20 can be smoothly engaged with the plug 32 of the adapter 30.

Figure 18:
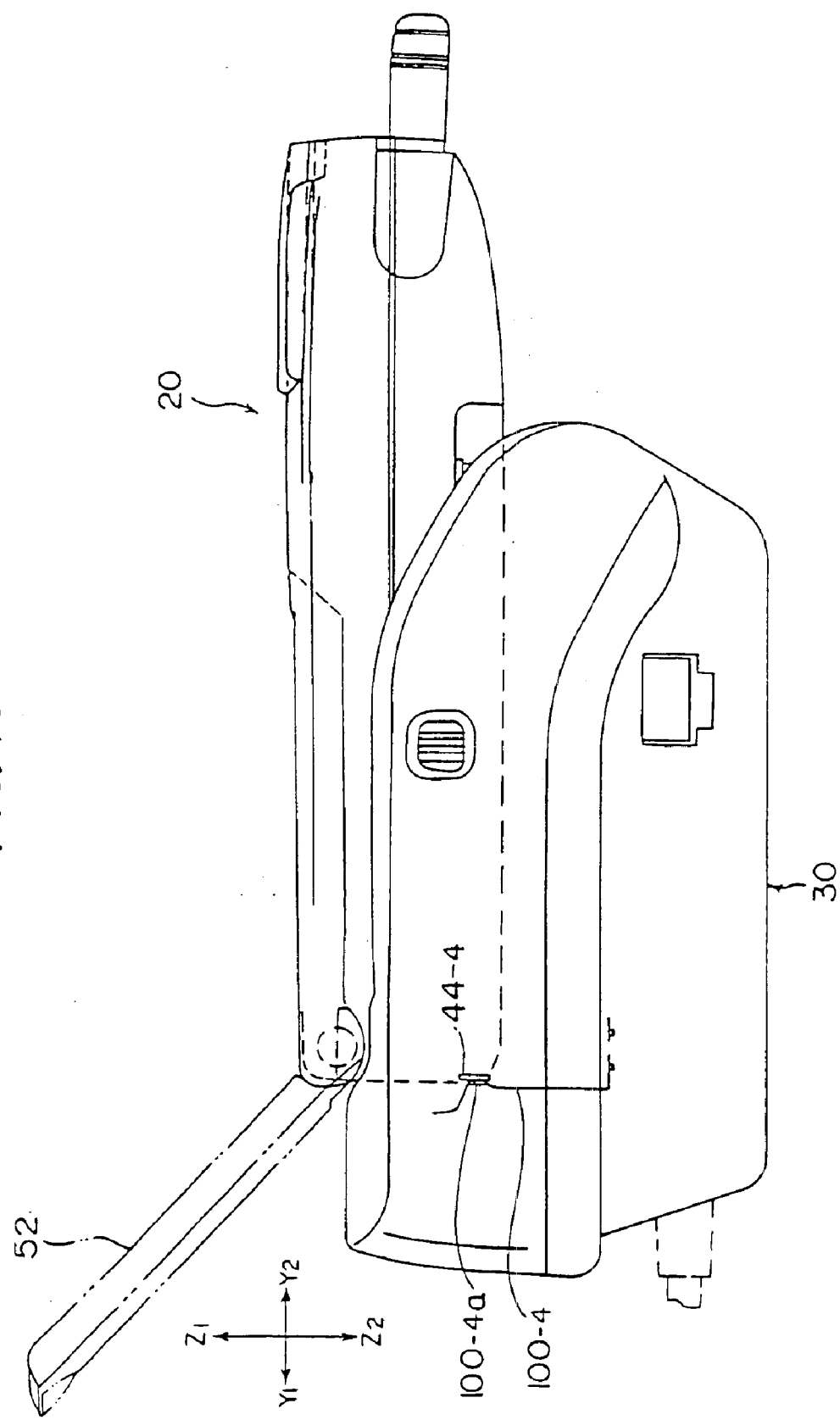

Second, the S-type battery pack 22 is electrically connected to the terminals 100-1 through 100-4. That is, as shown in FIG. 18, the four terminals 43 of the S-type battery pack 22 attached to the portable telephone 20 are brought into contact with the contacts 100-1a through 100-4a of the terminals 100-1 through 100-4. Since the portable telephone 20 is guided by the guide ribs 71, 72, 74 and 75 so that the height of the portable telephone 20 is limited, the terminals 44-1 through 44-4 are accurately in contact with the contacts 100-1a through 100-4a.

Figure 20A:
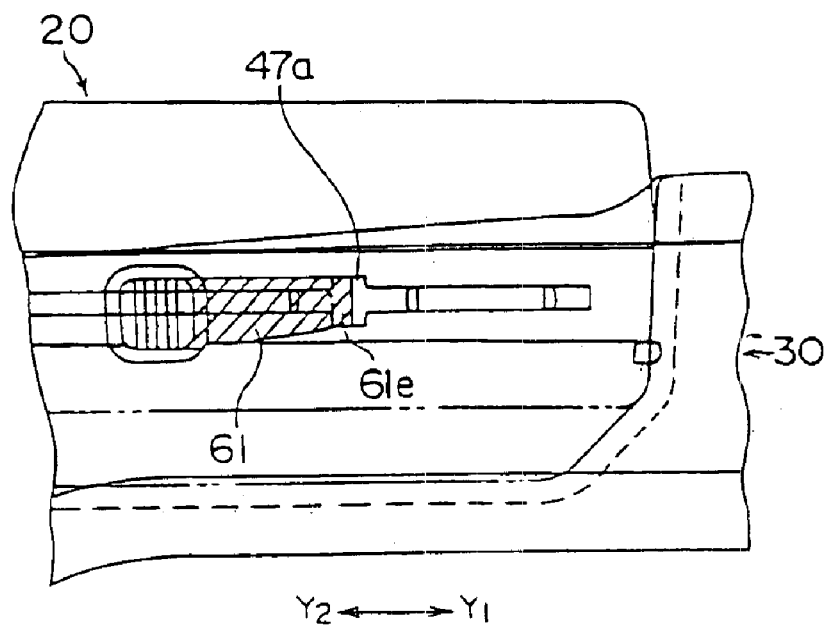
FIGS. 20A, 20B and 20C are diagrams illustrating a state where a clamping concave portion is engaged with a clamping claw.
Figure 20B:
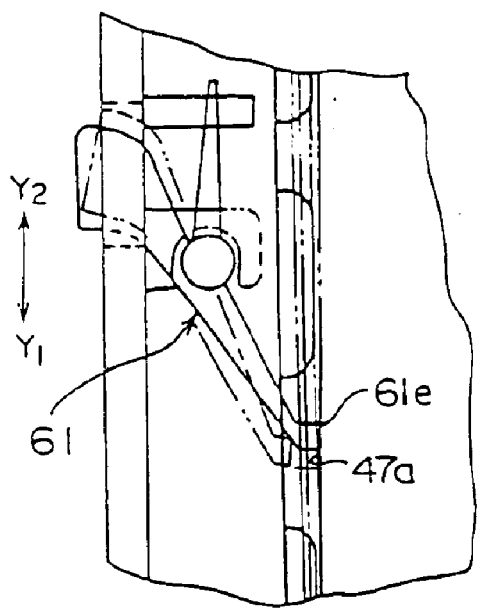
Figure 20C:
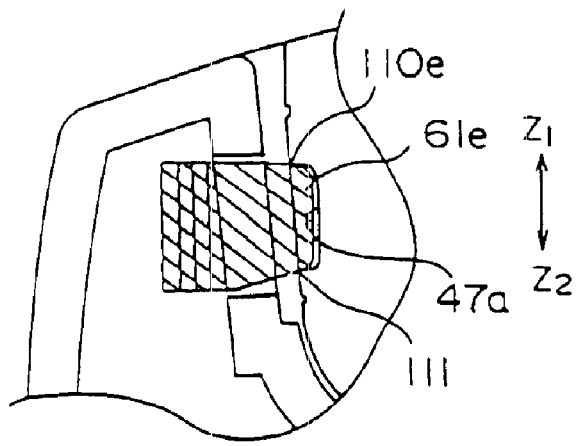
Figure 21:
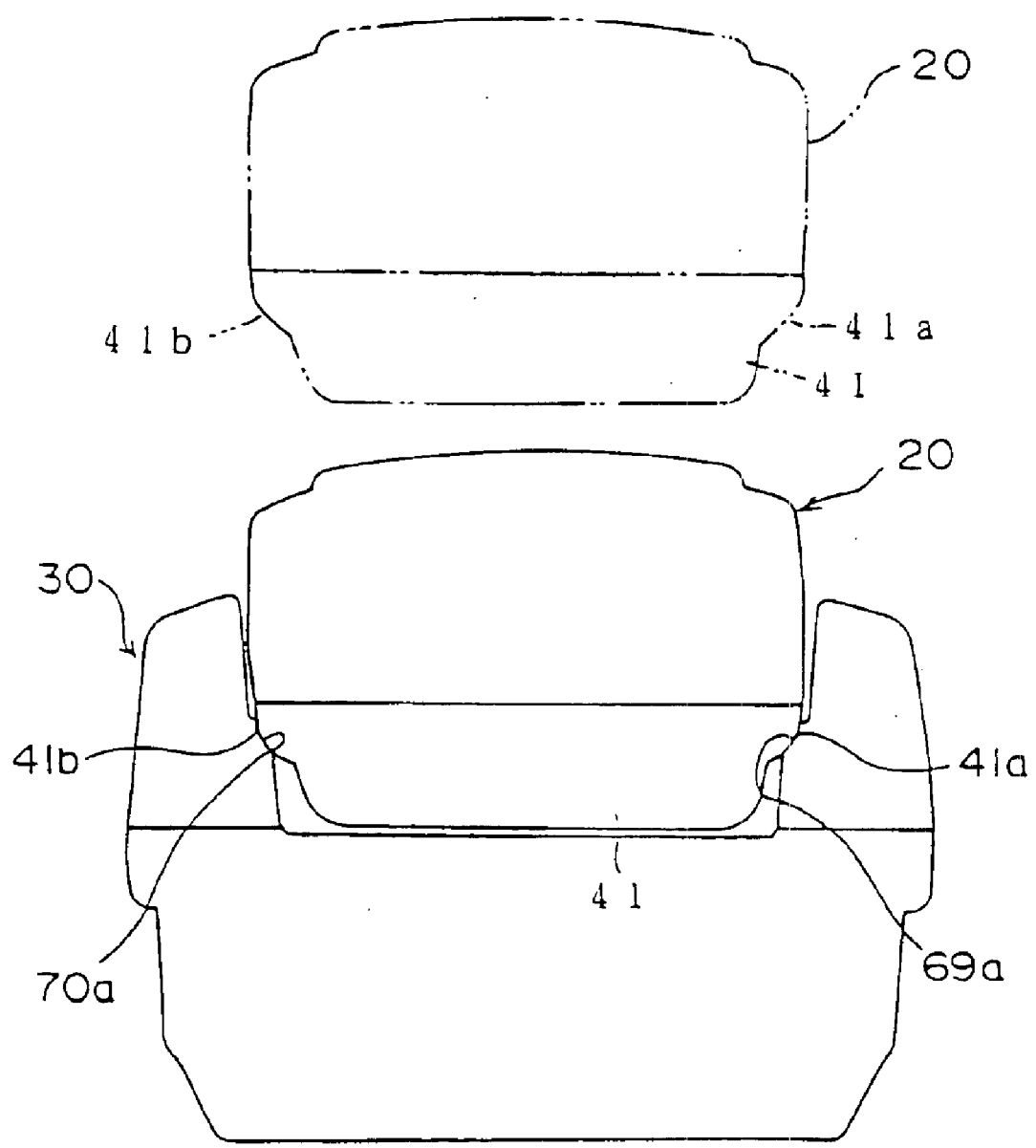
FIG. 21 is a diagram illustrating the adapter in which the portable telephone having an L-type battery pack is set.

Third, the portable telephone 20 is mechanically locked on the adapter body 31. That is, when the portable telephone 20 is moved until the socket 21 and the plug 32 are engaged with each other, the clamping concave portions 47 and 47A formed on the side surfaces of the portable telephone 20 face the clamping claws 61e and 61Ae of the clamping units 61 and 61A. The clamping units 61 and 61A are then pivoted by the spring forces of the third arms 61d and 61Ad, so that the clamping claws 61e and 61Ae project from the openings 73 and 76 and are engaged with the clamping concave portions 47 and 47A, as shown in FIGS. 20A, 20B and 20C. As a result, the portable telephone 20 is locked on the adapter body 31.

Figure 17:
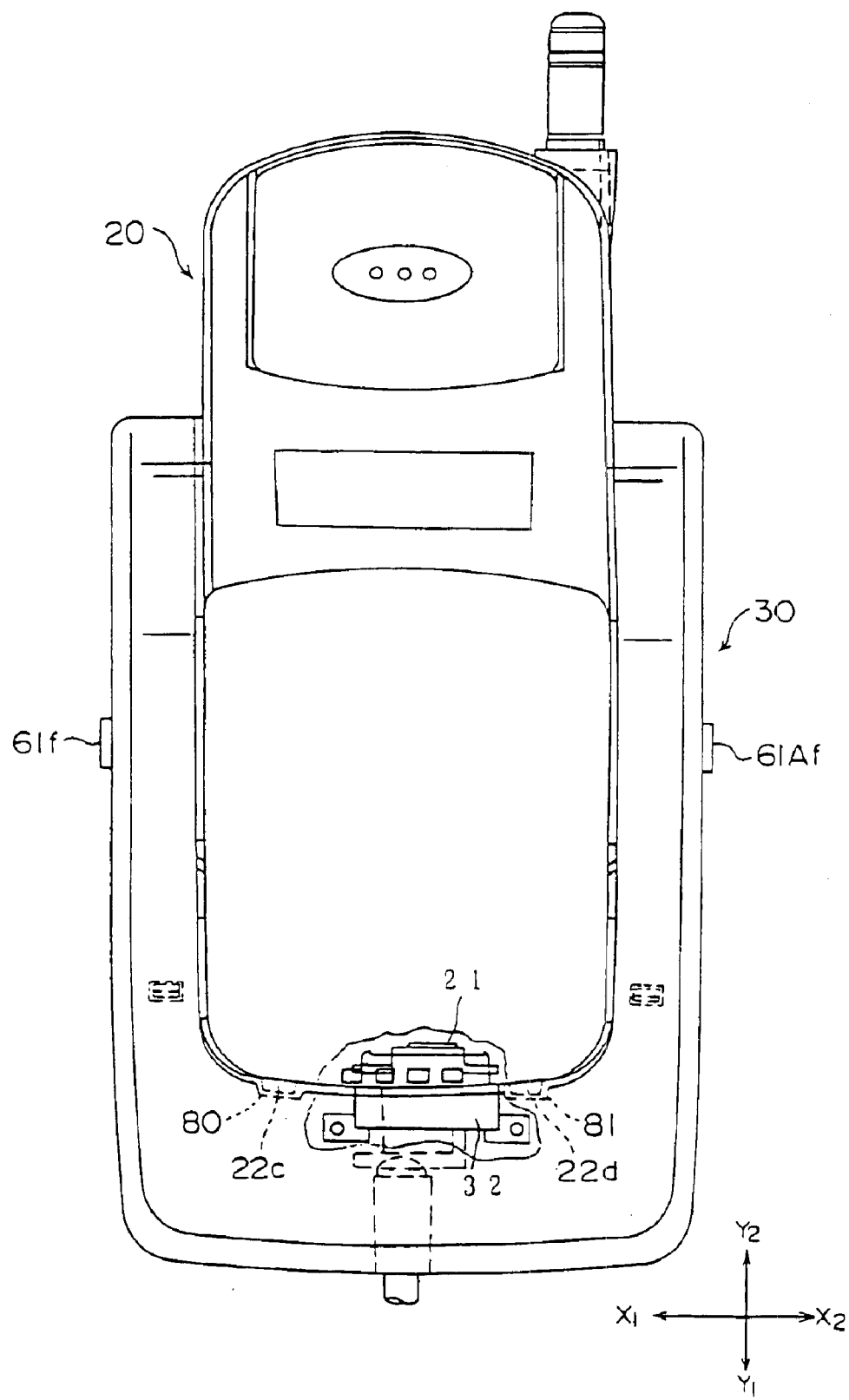
FIGS. 17 and 18 are diagrams illustrating a state where the portable telephone is set in the adapter.

Fourth, as shown in FIG. 17, projections 22c and 22d which are formed on the end surface of the S-type battery pack 22 are engaged with concave portions 80 and 81 formed on the inner surface 68 of the base 64a of the adapter body 31.

According to the above operations, the portable telephone 20 is set on the adapter 30 as shown in FIGS. 17 and 18. When the portable telephone 20 is set on the adapter 30, the portable telephone 20 is coupled to the antenna 15 of the vehicle 14 as shown in FIG. 2. In this state, the portable telephone 20 can be used as an operation unit of the mobile telephone. To use the portable telephone 20 as the operation unit of the mobile telephone, the flipper 52 is opened. The portable telephone 20 is operated using the battery 17 in the vehicle 14. The S-type battery pack 22 is charged by the battery 17 in the vehicle 14.

According to the above embodiment, by only setting the portable telephone 20 on the adapter 30, the portable telephone 20 can be used as the operation unit of the mobile telephone in the vehicle 14. It is not necessary to connect the portable telephone to the connector which is at the tip of the curl cord 16 as shown in FIG. 1. Thus, the handling of the adapter for the portable telephone is improved.

Further, the clamping claws 61e press an upper edge 110 and a lower edge 111 of the clamping concave portion 47, as shown in FIG. 20C. Thus, the position of the portable telephone 20 in up-and-down directions (the directions Z1 and Z2) can be limited by the clamping units 61 and 61A with the guide ribs 71, 72, 74 and 75.

The surfaces 22a and 22b of the S-type battery pack 22 are supported by the supporting portions 69a and 70a which are respectively formed on the inner surfaces 69 and 70 of the arm portions 64b and 64c. As a result, even if the portable telephone 20 is pressed against the adapter 30, the guide ribs 71, 72, 74 and 75 are prevented from being damaged.

A description will now be given of operations for removing the portable telephone 20 from the adapter 30.

To remove the portable telephone 20 from the adapter 20, the user grasps the portable telephone 20 by hand and pushes the pushing portions 61f and 61Af of the clamping units 61 and 61A. Further, the user grasps the antenna side portion of the portable telephone 20 by another hand and pulls the portable telephone 20 in the direction Y2.

When the pushing portions 61f and 61Af are pushed, the clamping units 61 and 61A are pivoted on the shaft 61a and 61Aa as shown by the chain double-dashed line in FIG. 20B. As a result, the clamping claws 61e and 61Ae are disconnected from the clamping concave portions 47 and 47A of the portable telephone 20. That is, the portable telephone 20 is released. In this state, the portable telephone 20 is pulled in the direction Y2 so as to be removed from the adapter 30.

The S-type battery pack 22 attached to the portable telephone 20 which is removed from the adapter 30 has been charged, so that the portable telephone 20 is usable.

In a case where the L-type battery pack 41 is attached to the portable telephone 20, the portable telephone 20 is set on the adapter in a state where the L-type battery pack 41 is in the concave portion 65 and the surfaces 41a and 41b of the L-type battery pack 41 are supported by the supporting surfaces 69a and 70a, as shown in FIG. 20.

Figure 22:
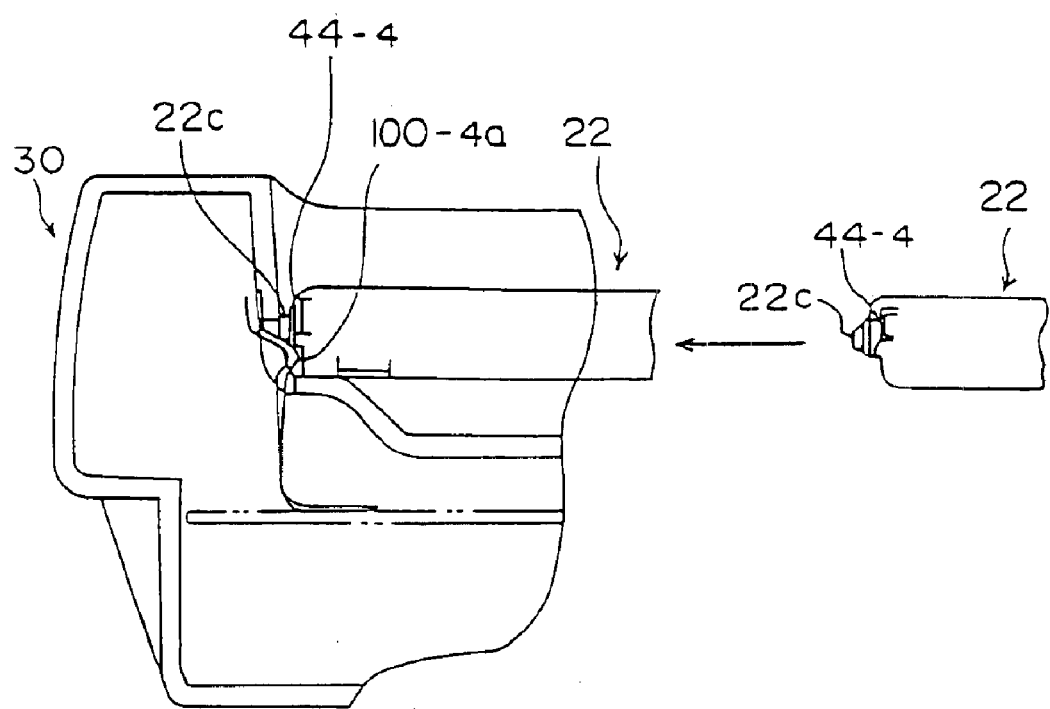
FIG. 22 is a diagram illustrating a state where an S-type battery pack turned back out is set in the adapter.
Figure 23A:
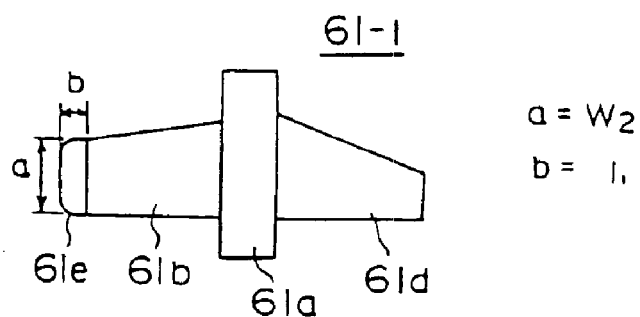
FIGS. 23A, 23B, 23C, 23D and 23E are diagrams illustrating a variation of the clamping unit.
Figure 23E:
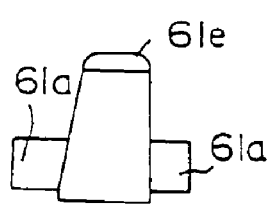
Figure 23B:
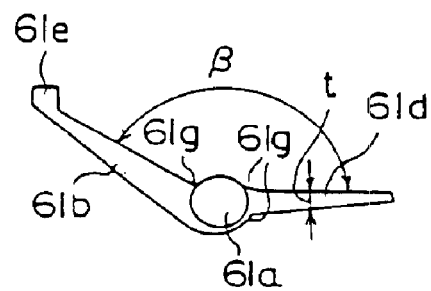
Figure 23D:
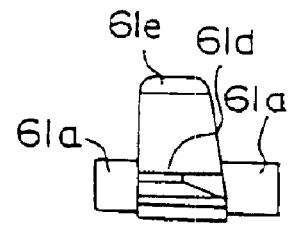
Figure 23C:
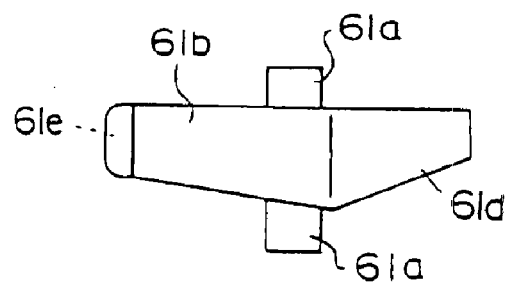

As shown in FIG. 4B, the projections 22c and 22d are not on a center line 22e in a direction of the thickness of the S-type battery pack 22. Thus, even if the S-type battery pack which is turned over is inserted in the adapter 30 as shown in FIG. 22, the projections 22c and 22d are not engaged with the concave portions 80 and 81 formed on the inner surface 68. The projections 22c and 22d strike the inner surface 68 of the adapter 30 so that the terminals 44-1 through 44-4 of the S-type battery pack 22 are not in contact with the contacts 100-1a through 100-4a of the terminals 100-1 through 100-4. Thus, an accident by which the terminals 44-1 through 44-4 inadvertently contact incorrect terminals can be avoided.

A variation of the clamping unit is shown in FIGS. 23A, 23B, 23C, 23D and 23E. In FIGS. 23A, 23B, 23C, 23D and 23E, those parts which are the same as those shown in FIGS. 14A, 14B, 14C, 14D and 14E are given the same reference numbers. A clamping unit 61-1 in this variation does not have parts corresponding to the second arm 61c and the pushing portion 61f shown in FIGS. 14A, 14B, 14C, 14D and 14E.

Referring to FIGS. 23A, 23B, 23C, 23D and 23E, the clamping unit 61-1 has the shaft 61a, the first arm 61b, the third arm 61d and the clamping claw 61e. The third arm 61d is formed of a thin plate and extends in a direction at an angle β (e.g., about 150 degrees) with respect to a direction in which the first arm 61b extends. The clamping claw 61e is formed at the tip of the first arm 61b.

Figure 25:
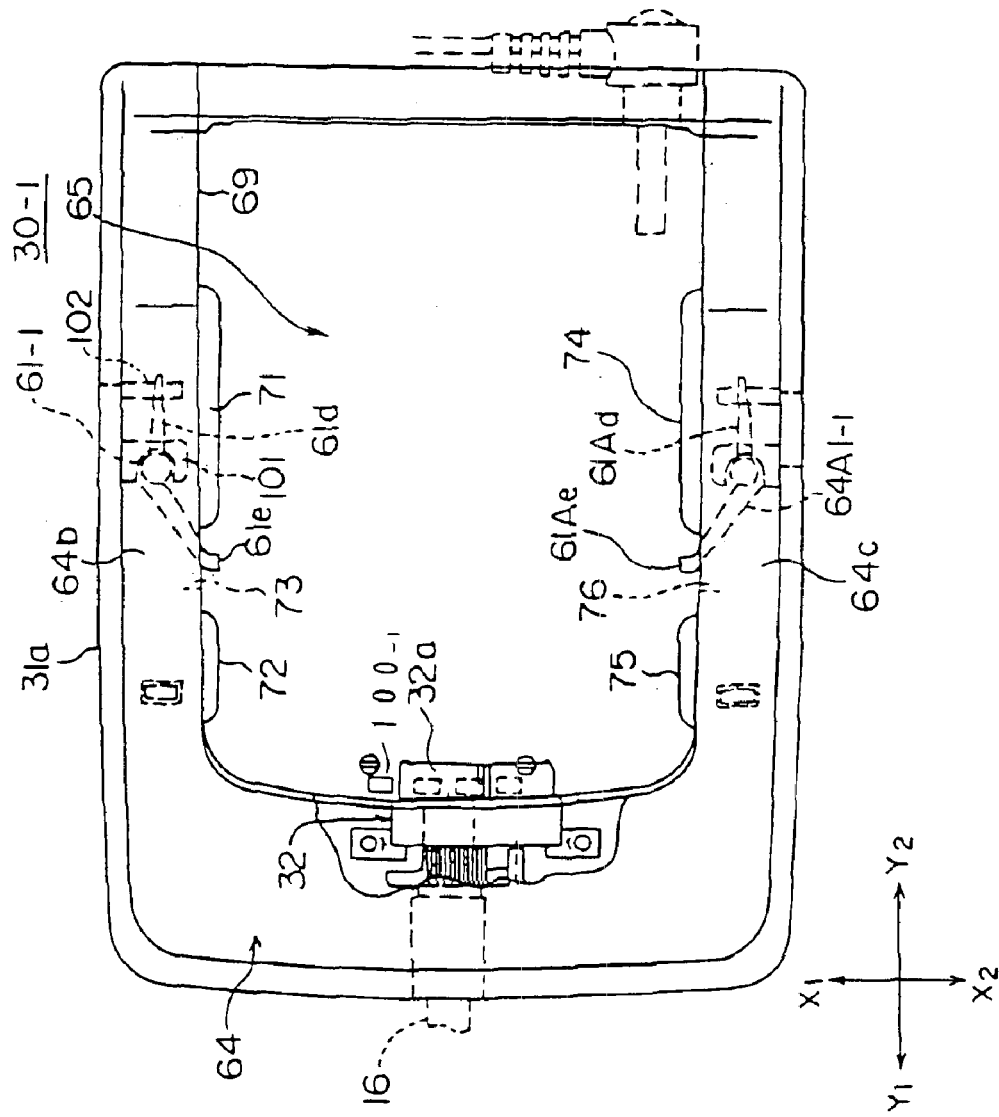
FIG. 25 is plan view of the adapter shown in FIG. 24.

FIGS. 24 and 25 shows an adapter 30-1 including the clamping units having the structures described above.

To set the portable telephone 20 on the adapter 30-1 shown in FIGS. 24 and 25, the same operations as in the case where the portable telephone 20 is set on the adapter 30 as described above are performed. That is, the portable telephone 20 is put in the concave portion 65 and moved in the direction C2 until the socket 21 of the portable telephone 20 is connected to the connector 32.

To remove the portable telephone 20 from the adapter 30-1, the portable telephone 20 is pulled in a direction opposite to the direction C2. When a force is added to the portable telephone 20 in the direction opposite to the direction C2, the third arm 61d which is a thin plate is temporarily bent, so that the clamping claw 61e is disconnected from the clamping concave portion 47. That is, the portable telephone 20 is released on the adapter 30-1. The portable telephone 20 is further pulled and removed from the adapter 30-1. When the portable telephone 20 is removed from the adapter 30, the third arm 61d returns to the original state due to the spring force of the third arm 61d, so that the clamping claw 61e projects from the opening 73.

The following optional modules may be attached to the portable telephone 20.

FIGS. 26A, 26B, 26C, 27 and 28 show a vibrator module 200. Referring to FIGS. 26A, 26B and 26C, the vibrator module 200 has a body 201 and clamping arms 202 and 203. The clamping arms 202 and 203 project from sides of the body 201 so as to extend in a direction (the direction Y2) perpendicular to directions (the directions X1 and X2) along the width of the body 201. Claws 202a and 203a are respectively formed at tips of the clamping arms 202 and 203. At ends of the clamping arms 202 and 203 which ends are opposite to the tips thereof, pushing portions 202b and 203b are respectively formed. The clamping arms 202 and 203 are pivotably supported in the body 201. Biasing forces of springs 204 and 205 are added to clamping arms 202 and 203 so that the claws 202b and 203b come closer to each other.

Figure 26:
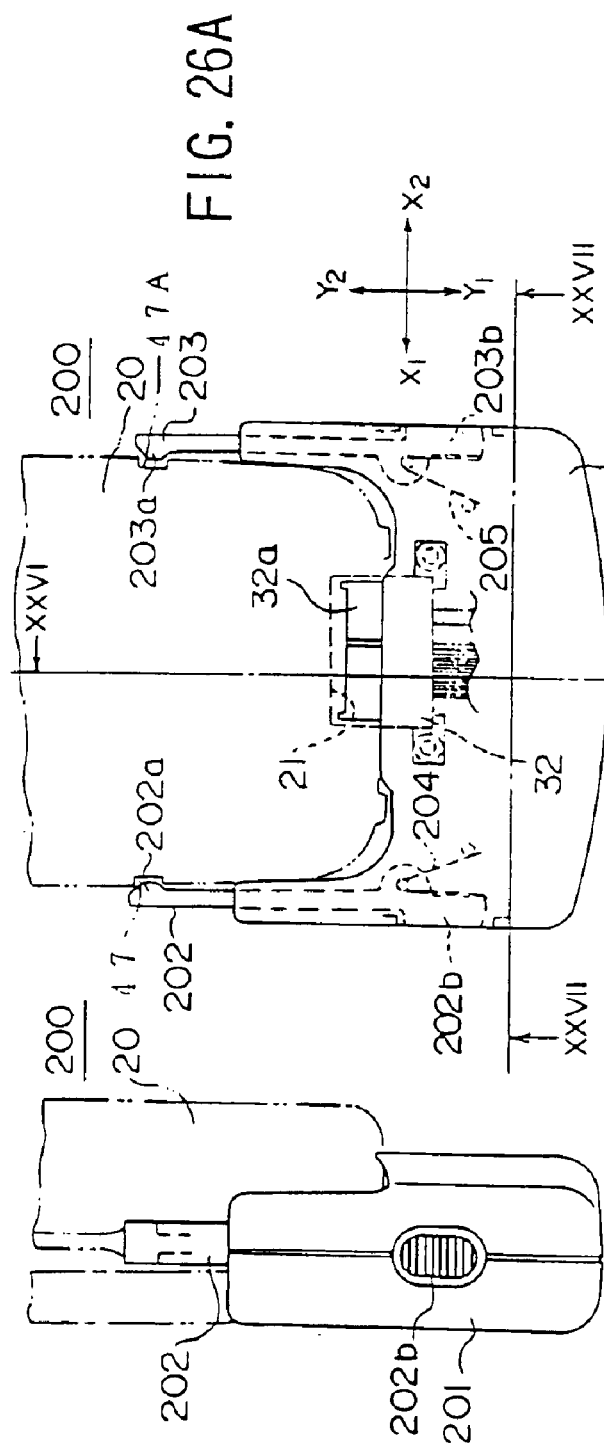
FIGS. 26A, 26B and 26C are diagrams illustrating a vibrator module.
Figure 27:
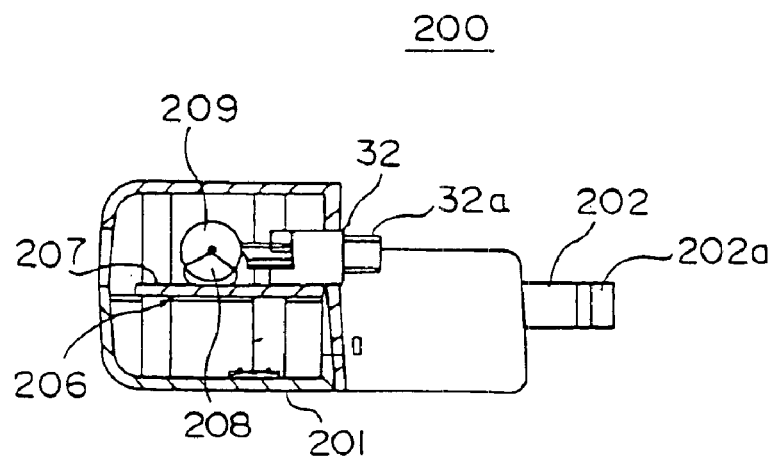
FIG. 27 is a cross sectional view taken along line XXVI—XXVI shown in FIG. 26A.
Figure 28:
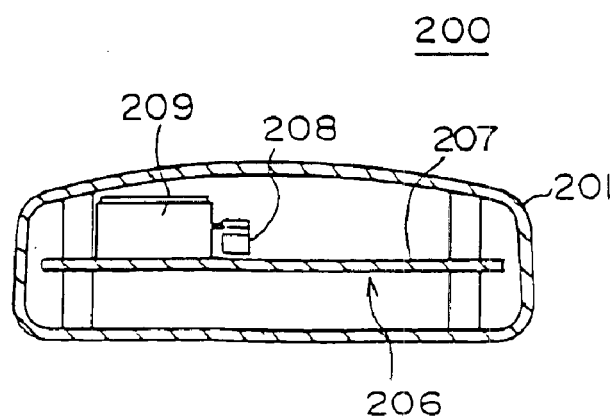
FIG. 28 is a cross sectional view taken along line XXVII—XXVII shown in FIG. 26A.
Figure 29:
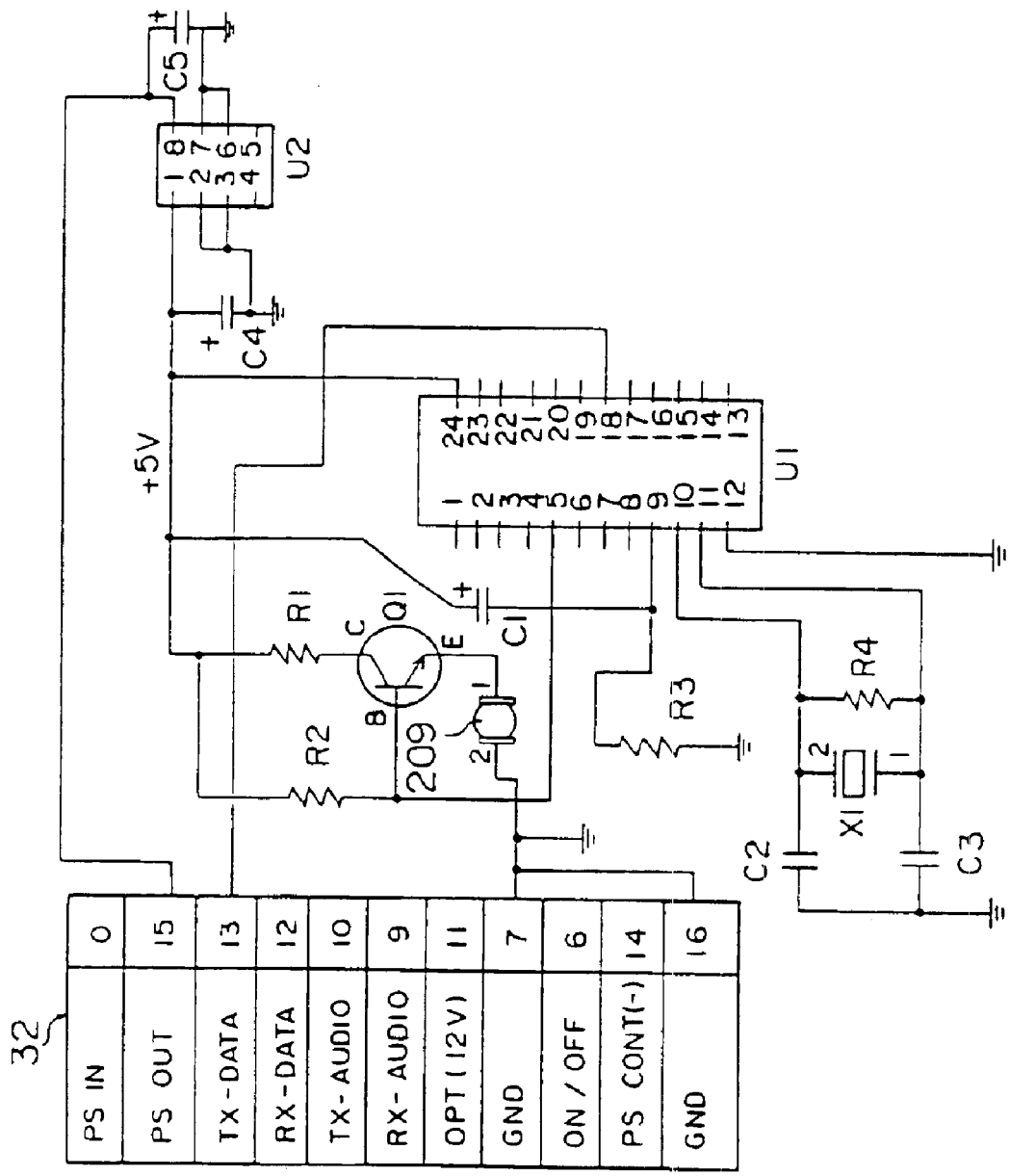
FIG. 29 is a circuit diagram illustrating the vibrator module.

As shown in FIG. 26 which is a cross sectional view taken along line XXVI—XXVI shown in FIG. 26A and in FIG. 27 which is a cross sectional view taken along XXVII—XXVII shown in FIG. 26A, a circuit board assembly 206 is mounted in the body 201. The circuit board assembly 206 is provided with a circuit board 207, a motor 209, a connector 32 and so on. The motor 209 which rotates an eccentric weight 208 and the connector 32 are fixed on the circuit board 207. Further, a circuit as shown in FIG. 29 is formed on the circuit board 207.

The vibrator module 200 is attached to the portable telephone 20 such that the portable telephone 20 is put between the clamping arms 202 and 203 and the socket side surface 42 of the portable telephone 20 is in contact with the body 201 of the vibrator module 200. The claws 202a and 203a of the clamping arms 202 and 203 are engaged with the clamping concave portions 47 and 47A of the portable telephone 20. In this state, the plug 32a of the connector 32 is connected to the socket 21 of the portable telephone 20. As a result, electric circuits in the portable telephone 20 are electrically connected to the circuit, shown in FIG. 29, provided in the body 201 of the vibrator module 200. When portable telephone 20 receives a calling signal, the motor 209 is driven in the vibrator module 200. Due to rotation of the eccentric weight by driving of the motor 209, the vibrator module 200 vibrates. The user can know the call by the vibration of the vibrator module 200.

Figure 30:
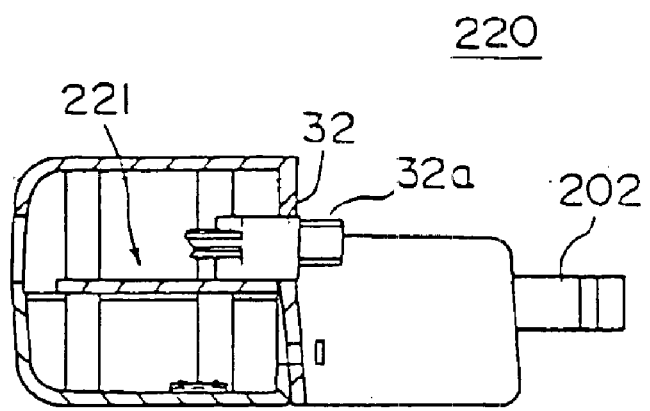
FIG. 30 is a diagram illustrating a recording/reproducing module.

FIG. 30 shows a recording/reproducing module 220. The recording/reproducing module 220 has the same exterior as the vibrator module 200 as shown in FIGS. 26A, 26B and 26C. Referring to FIG. 30, a recording/reproducing control circuit 221 and the connector are mounted in a body of the recording/reproducing module 220. The recording/reproducing module 220 is attached to the portable telephone 20 in the same manner as the vibrator module 200 described above. For example, in a case where the portable telephone 20 is carried by the user, when the portable telephone 20 receives a call, contents of the call are recorded by the recording/reproducing module 220. After that, when the user carries out predetermined operations, the recorded information is reproduced by the recording/reproducing module 220.

Figure 31:
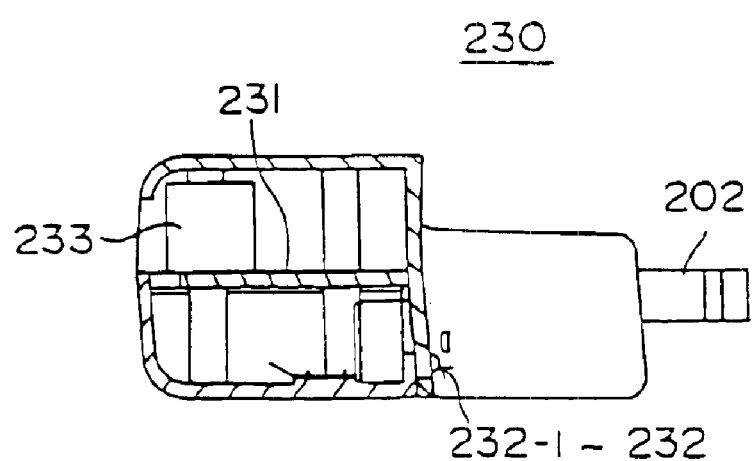
FIG. 31 is a diagram illustrating a charging module.

FIG. 31 shows a charging module 230. The charging module 230 has the same exterior as the vibrator module 200 as described above. Referring to FIG. 31, a charging circuit 231, terminals 232-1 through 232-4 and a DC jack 233 are mounted in a body of the charging module 230. The charging module 230 is attached to the portable telephone 20 having the S-type battery pack 22 or the L-type battery pack 41 in the same manner as the vibrator module 200 so that the terminals of the battery pack and the terminals 232-1 through 232-4 are in contact with each other. A power supply is connected to the DC jack 233, and the S-type battery pack 22 or the L-type battery pack 41 is charged.

Ends of the terminals 232-1 through 232-4 are connected to a connecting bar 234 as shown in FIG. 32A. The terminals 232-1 through 232-4 connected to each other by the connecting bar 234 are bent as shown in FIG. 232-4 and mounted in the charging module 230. Finally, the connecting bar 234 is cut off.

Figure 34:
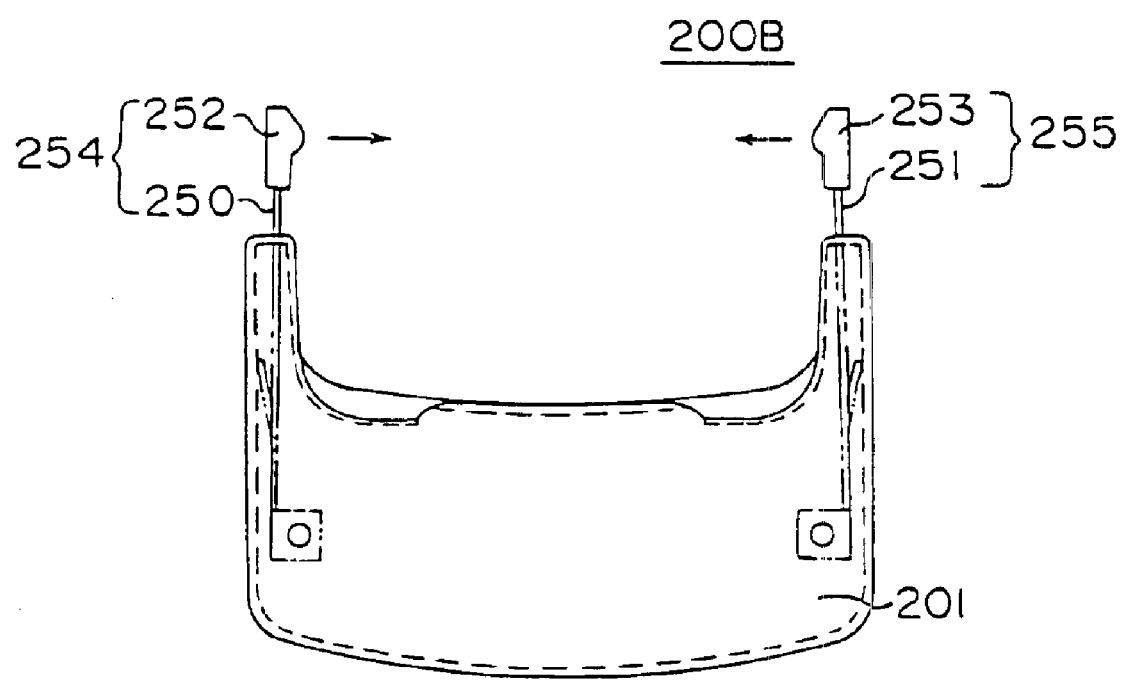
FIG. 34 is a diagram illustrating a second variation of the vibrator module.

FIGS. 33 and 34 show variations of the vibrator module 200. A vibrator module 200A shown in FIG. 33 has clamping arms 240 and 241 which are integrated into the body 201. A vibrator module 200B shown in FIG. 34 has clamping arms 254 and 255 which are respectively formed of metal leaf springs 250 and 251 and claws 252 and 253 mounted at tips of the metal leaf springs 250 and 251.

Figure 35:
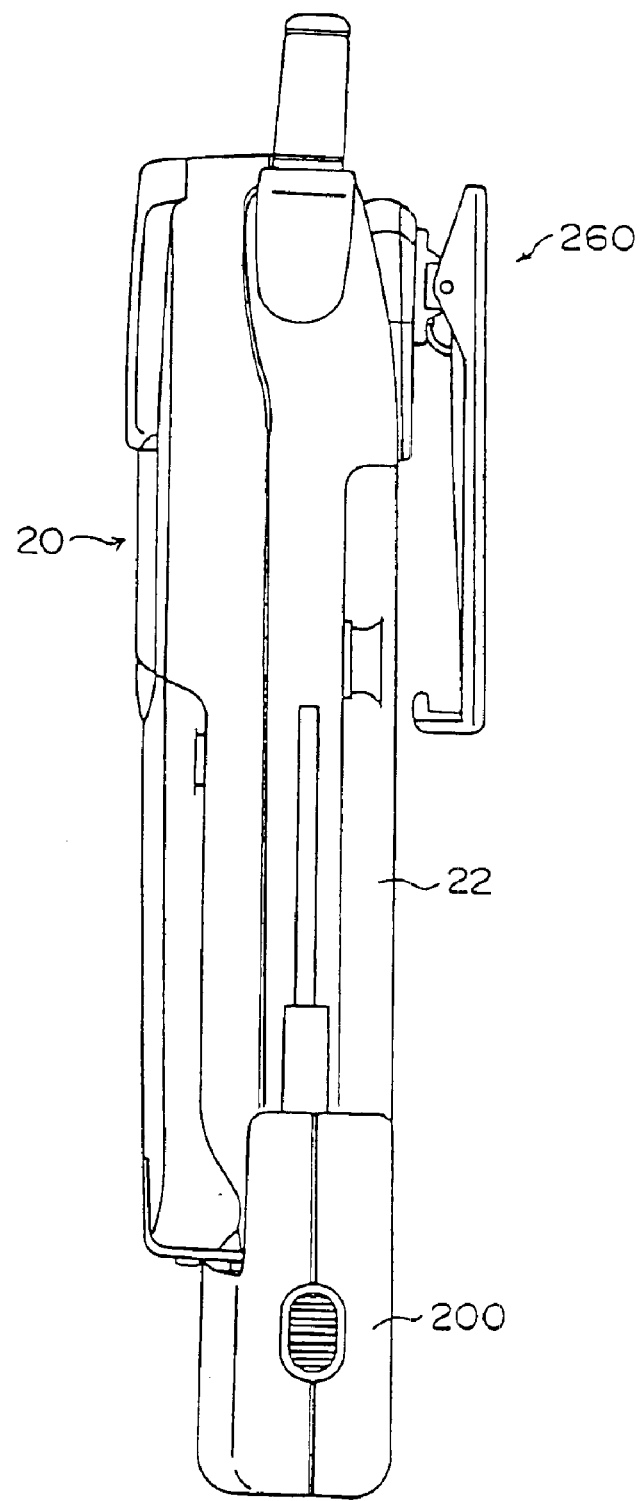
FIG. 35 is a diagram illustrating the portable telephone on which the vibrator module and a belt clip are set.

The vibrator module 200 is attached to the portable telephone 20 as shown in FIG. 35. That is, the socket side end portion of the portable telephone 20 is covered with the vibrator module 200. Thus, a belt clip 260 can be mounted on a back of an antenna side end portion of the portable telephone 20 which is opposite to the socket side end portion, as shown in FIG. 35.

The present invention is not limited to the aforementioned embodiments, and other variations and modifications may be made without departing from the scope of the claimed invention.

What is claimed is:

1. An attachable unit which is attachable to a portable telephone, the portable telephone having a housing, a first electronic circuit and a first electrical connector, the first electrical connector being connected to said first electronic circuit at a portion of said housing, said attachable unit comprising:

a body;

an attachable mechanism which attaches said attachable unit to said portable telephone, the attachable mechanism including a clamping unit extending from a side of the body, the clamping unit having a claw at one end of the clamping unit and a pushing portion at the other end, the claw end extending from an end of said attachable unit, the claw being engagable with a recess of said portable telephone, the pushing portion being provided on the side of the body and operable to release the claw from the recess of said portable telephone;

a second electronic circuit enclosed in said body; and a second electrical connector provided at a portion of said body and directly connected to the first electrical connector when the attachable unit is attached to said portable telephone, the second electronic circuit being connected to the first electronic circuit by connecting the second connector to the first connector;

wherein the attachable unit when attached to said portable telephone is portably operable with said portable telephone.

2. An attachable unit which is attachable to a portable telephone, the portable telephone having a first electronic circuit, said attachable unit comprising:

a body;

an attachable mechanism which attaches said attachable unit to said portable telephone, the attachable mechanism including a clamping unit extending from a side of the body, the clamping unit having a claw at one end of the clamping unit and a pushing portion at the other end, the claw end extending from an end of said attachable unit, the claw being engagable with a recess of said portable telephone, the pushing portion being provided on the side of the body and operable to release the claw from the recess of said portable telephone; and a second electronic circuit, enclosed in said body, which is connected to said first electronic circuit when said attachable unit is attached to said portable telephone;

wherein the attachable unit when attached to said portable telephone is portably operable with said portable telephone.

* * * * *